(12) United States Patent
Benjamin et al.

(10) Patent No.: US 10,748,109 B2
(45) Date of Patent: Aug. 18, 2020

(54) SYSTEMS AND METHODS FOR MONITORING TRANSPORTED CARGO

(71) Applicant: Locus Solutions, LLC, Jupiter, FL (US)

(72) Inventors: David Benjamin, Jupiter, FL (US); Blair Nygren, Jupiter, FL (US); Rodney Parsons, Jupiter, FL (US); Chris Lafferty, Jupiter, FL (US)

(73) Assignee: LOCUS SOLUTIONS, LLC, Jupiter, FL (US)

( * ) Notice: Subject to any disclaimer, the term of this patent is extended or adjusted under 35 U.S.C. 154(b) by 459 days.

(21) Appl. No.: 15/057,887

(22) Filed: Mar. 1, 2016

(65) Prior Publication Data
US 2016/0260058 A1 Sep. 8, 2016

Related U.S. Application Data

(60) Provisional application No. 62/127,175, filed on Mar. 2, 2015.

(51) Int. Cl.
*G06Q 10/08* (2012.01)
*H04W 8/00* (2009.01)
(Continued)

(52) U.S. Cl.
CPC ..... *G06Q 10/0833* (2013.01); *G06Q 10/0832* (2013.01); *H04W 4/027* (2013.01);
(Continued)

(58) Field of Classification Search
CPC ..... G06Q 10/0833; G06Q 10/08; H04W 4/70; H04W 4/027; Y02D 70/00; Y02D 70/166;
(Continued)

(56) References Cited

U.S. PATENT DOCUMENTS 6,847,892 B2 * 1/2005 Zhou ............... G01S 5/0027
340/426.1
7,053,823 B2 * 5/2006 Cervinka ............... G08B 25/08
342/357.31
(Continued)

FOREIGN PATENT DOCUMENTS

CN 1728625 A 2/2006
JP 200642203 A 2/2006
(Continued)

OTHER PUBLICATIONS

Xiao, Shuo & Dhamdhere, Ashay & Sivaraman, Vijay & Burdett, Alison. (2009). Transmission Power Control in Body Area Sensor Networks for Healthcare Monitoring. Selected Areas in Communications, IEEE Journal on. 27. 37-48. 10.1109/JSAC.2009.090105 . (Year: 2009).*
(Continued)

*Primary Examiner* — Daniel Vetter
*Assistant Examiner* — Manal A. Alsamiri
(74) *Attorney, Agent, or Firm* — Harness, Dickey & Pierce, P.L.C.

(57) ABSTRACT

Systems and methods relating to monitoring cargo are provided. Various embodiments provide features relating to: (1) monitoring characteristics of cargo using a single device that may be disposable; (2) generating alerts based on a variety of temperature conditions, such as multiple temperature thresholds; (3) providing multiple levels of alerts and escalating alerts to different users; (4) providing an indication of an end of trip based on location data and data from sensor(s); (5) reducing power of transmissions between devices; (6) using frequency diversity features to communicate between devices; (7) providing configurable reporting and/or sensor monitoring parameters, and changing reporting and/or sensor measurement periods; (8) allowing for communication with devices across multiple frequency
(Continued)

bands; (9) utilizing secondary communication circuits to communicate with different devices, such as across different frequency channels and/or bands; and (10) using a movement detection device (e.g., an accelerometer) to reduce false indications of movement.

13 Claims, 12 Drawing Sheets

(51) Int. Cl.
*H04W 4/70* (2018.01)
*H04W 4/02* (2018.01)

(52) U.S. Cl.
CPC .............. *H04W 4/70* (2018.02); *Y02D 70/00* (2018.01); *Y02D 70/142* (2018.01); *Y02D 70/144* (2018.01); *Y02D 70/164* (2018.01); *Y02D 70/166* (2018.01)

(58) Field of Classification Search
CPC ... Y02D 70/164; Y02D 70/144; Y02D 70/142
See application file for complete search history.

(56) References Cited

U.S. PATENT DOCUMENTS

| | | | |
|---|---|---|---|
| 9,846,086 B1* | 12/2017 | Robinson | ................ G01K 3/04 |
| 2005/0185659 A1 | 8/2005 | Sanderford | |
| 2008/0094209 A1 | 4/2008 | Braun | |
| 2008/0231459 A1* | 9/2008 | Corder | ................ G07C 5/008 340/572.7 |
| 2009/0228155 A1 | 9/2009 | Slifkin et al. | |
| 2009/0248218 A1 | 10/2009 | Dyrmose | |
| 2010/0299278 A1* | 11/2010 | Kriss | ................ G06Q 10/08 705/332 |
| 2013/0126704 A1 | 5/2013 | Gregory et al. | |
| 2013/0321122 A1* | 12/2013 | Lee | ................ G01S 5/0009 340/3.1 |
| 2014/0207374 A1* | 7/2014 | Taylor, Jr. | ................ G01C 21/16 701/470 |
| 2015/0135737 A1 | 5/2015 | Cresswell et al. | |

FOREIGN PATENT DOCUMENTS

| | | |
|---|---|---|
| RU | 2466460 C2 | 11/2012 |
| WO | WO-2001032480 A1 | 5/2001 |
| WO | WO-2006047877 A1 | 5/2006 |

OTHER PUBLICATIONS

Extended European Search Report regarding European Patent Application No. 16759357 dated May 18, 2018.
International Search Report regarding International Application No. PCT/US2016/020262, dated Sep. 29, 2016.
Written Opinion of the International Searching Authority regarding International Application No. PCT/US2016/020262, dated Sep. 29, 2016.
Final Office Action regarding U.S. Appl. No. 15/057,899 dated Nov. 26, 2018.
First Chinese Office Action regarding Chinese Patent Application No. 201680021939.3 dated Mar. 4, 2019.
Office Action regarding Mexican Patent Application No. MX/a/2017/011239, dated Jul. 9, 2019. Translation provided by Goodrich Riquelme y Asociados.
Non-Final Office Action regarding U.S. Appl. No. 15/057,899 dated Dec. 23, 2019.
Second Chinese Office Action regarding Chinese Patent Application No. 201680021939.3 dated Nov. 21, 2019, with English translation.
Office Action regarding European Patent Application No. 16759357.3 dated Dec. 16, 2019.
Second Office Action regarding Mexican Patent Application No. MX/a/2017/011239, dated Jan. 30, 2020. Translation provided by Goodrich Riquelme Asociados.

* cited by examiner

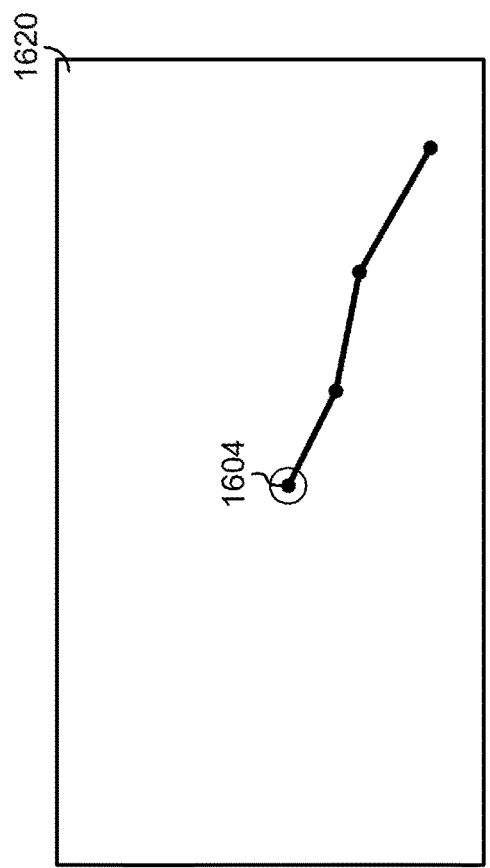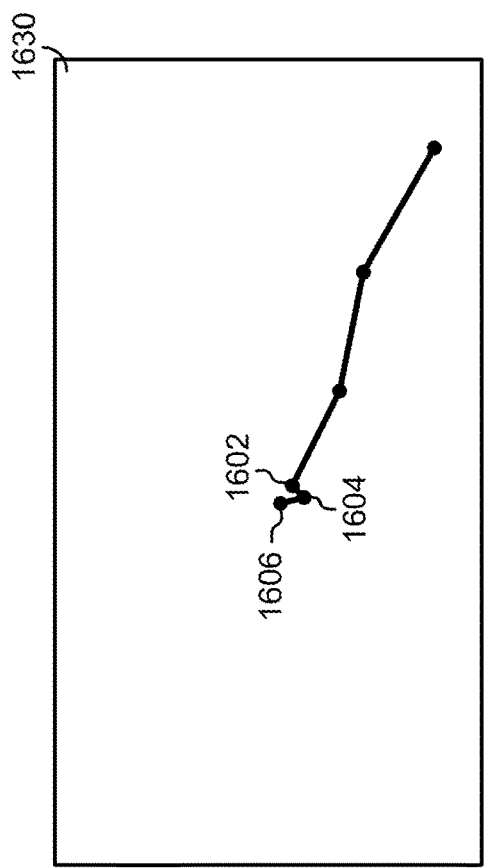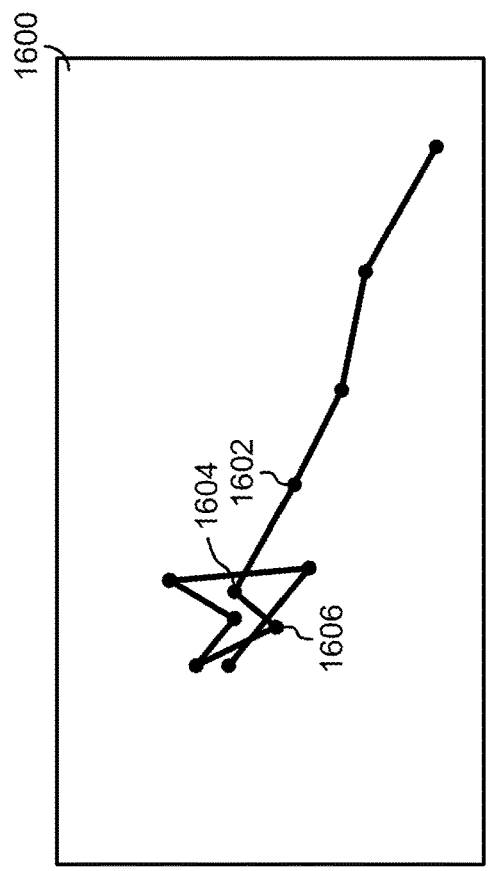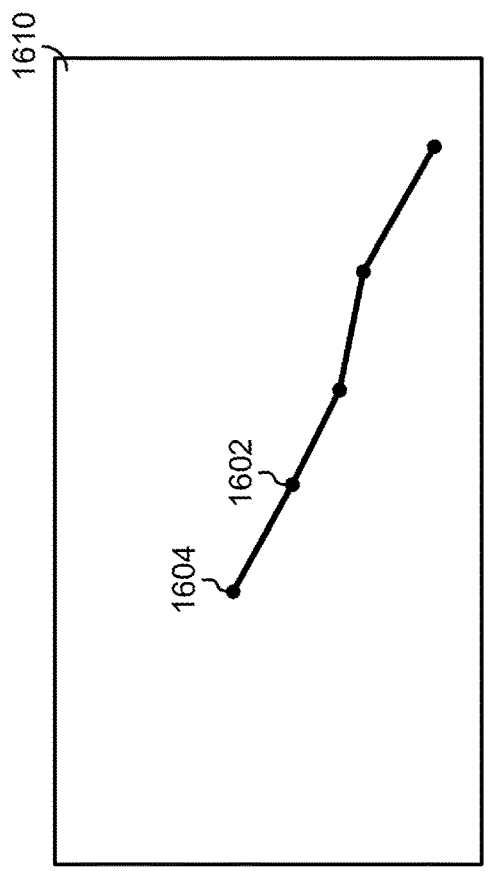
FIG. 16A
FIG. 16B
FIG. 16C
FIG. 16D

SYSTEMS AND METHODS FOR MONITORING TRANSPORTED CARGO

CROSS-REFERENCE TO RELATED APPLICATIONS

The present application claims priority to and the benefit of U.S. Provisional Patent Application No. 62/127,175, filed Mar. 2, 2015, which is incorporated herein by reference in its entirety.

BACKGROUND

Monitoring systems may be used to monitor transportation of goods from one location to another. For example, a monitoring system may be used to track the movement of a truck, car, ship, or other transportation vehicle as the vehicle travels to a destination to deliver goods. A portable monitoring device may be attached to the vehicle or goods in the vehicle and used to track the location of the vehicle as well as monitor various conditions in the vehicle. The portable monitoring device may be used to support various monitoring activities at the vehicle or remotely from the vehicle, including monitoring vehicle conditions (e.g., temperature inside the vehicle), a location of the vehicle relative to its destination or path, a current vehicle status (e.g., if the vehicle is stopped or moving slowly). The monitoring activities may further include monitoring the battery or power supply of the portable monitoring device itself.

SUMMARY

Some embodiments of the present disclosure relate to a method comprising monitoring a location of cargo during transportation of the cargo using data collected by a portable monitoring device; receiving input data from one or more sensors of the portable monitoring device, the input data relating to one or more characteristics pertaining to the cargo; and generating an alert indicating the cargo has reached a destination in response to a combination of the location monitored using the portable monitoring device and the input data from the one or more sensors of the portable monitoring device.

Some embodiments relate to a system comprising one or more processors operably coupled to one or more memories and configured to communicate with a portable monitoring device configured to monitor cargo during transportation of the cargo, the one or more processors configured to: monitor a location of cargo during transportation of the cargo using data collected by the portable monitoring device; receive input data generated by one or more sensors of the portable monitoring device, the input data relating to one or more characteristics pertaining to the cargo; and generate an alert indicating the cargo has reached a destination in response to a combination of the location monitored using the portable monitoring device and the input data from the one or more sensors of the portable monitoring device.

Some embodiments relate to a system comprising one or more sensors, the one or more sensors comprising at least one of a light sensor, a temperature sensor, an accelerometer, or a communication circuit. The system further comprises one or more processors operably coupled to one or more memories and configured to monitor cargo during transportation of the cargo, the one or more processors configured to: monitor a location of cargo during transportation of the cargo; receive, from the one or more sensors, input data from relating to one or more characteristics pertaining to the cargo; and generate an alert indicating the cargo has reached a destination in response to a combination of the location monitored using the portable monitoring device and the input data from the one or more sensors of the portable monitoring device, wherein the one or more processors are configured to generate the alert in response to determining the location is within a geographic area associated with the destination and the input data indicates at least one of the following: the light sensor has measured an increased intensity of ambient light; the temperature sensor has measured an increase in temperature above a threshold level; the accelerometer indicates a vehicle carrying the cargo is stationary; or the communication circuit has received a message from an external device located proximate to the destination.

In some embodiments, the one or more sensors comprise a light sensor, and generating the alert in response to the combination of the location and the input data comprises generating the alert in response to determining the location is within a geographic area associated with the destination and the input data indicates the light sensor has measured an increased intensity of ambient light.

In some embodiments, the one or more sensors comprise a temperature sensor, and generating the alert in response to the combination of the location and the input data comprises generating the alert in response to determining the location is within a geographic area associated with the destination and the input data indicates the temperature sensor has measured an increase in temperature above a threshold level.

In some embodiments, the one or more sensors comprise an accelerometer, and generating the alert in response to the combination of the location and the input data comprises generating the alert in response to determining the location is within a geographic area associated with the destination and movement data from the accelerometer indicates a vehicle carrying the cargo is stationary.

In some embodiments, the one or more sensors comprise an accelerometer, a temperature sensor, and a light sensor, and generating the alert in response to the combination of the location and the input data comprises generating the alert in response to determining the location is within a geographic area associated with the destination, and the input data indicates: the light sensor has measured an increase in temperature above a threshold level; the temperature sensor has measured an increase in temperature above a threshold level; and the accelerometer has detected a vehicle carrying the cargo is stationary.

In some embodiments, monitoring the location of the cargo using data collected by the portable monitoring device comprises monitoring the location of the cargo using cellular signals received by a cellular transceiver of the portable monitoring device.

In some embodiments, the method further comprises and/or the one or more processors are configured to perform operations including generating a command configured to cause a subscriber identity module (SIM) card coupled to the cellular transceiver of the portable monitoring device to deactivate in response to generating the alert indicating the cargo has reached the destination.

In some embodiments, the method further comprises and/or the one or more processors are configured to perform operations including performing at least one of the following in response to generating the alert indicating the cargo has reached the destination: disabling measurement of a temperature using a temperature sensor of the temperature recording device; or excluding temperature measurements measured after the alert is generated from a set of temperature measurements for the cargo.

In some embodiments, the method further comprises and/or the one or more processors are configured to perform operations including generating a second alert indicating transportation of the cargo has begun in response to a combination of the location monitored using the portable monitoring device and the input data from the one or more sensors of the portable monitoring device.

In some embodiments, the one or more sensors comprise a communication circuit configured to communicate with an external device located proximate to the destination, and generating the alert in response to the combination of the location and the input data comprises generating the alert in response to determining the location is within a geographic area associated with the destination and the input data indicates the communication circuit has received a message from the external device located proximate to the destination.

In some embodiments, the method further comprises and/or the one or more processors are configured to perform operations including: determining a distance from a current location of the portable monitoring device to the destination; determining a first time at which delivery of the cargo is scheduled to be completed; estimating a second time at which the cargo is expected to be delivered using the distance; determining whether the cargo is likely to be delivered by the first time by comparing the first time to the second time; and providing a notification to a user in response to determining the cargo is likely to be delivered after the first time.

Some embodiments relate to a method comprising: determining one or more characteristics relating to cargo during transportation of the cargo using data collected by a portable monitoring device, the portable monitoring device configured to periodically transmit a signal generated using the data to a remote computing device via a network; and changing at least one of the following based on the one or more characteristics relating to the cargo: a first period at which the signal is transmitted by the portable monitoring device; or a second period at which one or more sensors of the portable monitoring device collect the data used to determine the one or more characteristics.

Some embodiments relate to a system comprising: one or more processors operably coupled to one or more memories and configured to communicate with a portable monitoring device configured to monitor cargo during transportation of the cargo, the one or more processors configured to: periodically receive a signal from the portable monitoring device providing one or more characteristics relating to the cargo during transportation of the cargo via a network; determine a change to at least one of the following based on the one or more characteristics relating to the cargo: a first period at which the signal is transmitted by the portable monitoring device; or a second period at which one or more sensors of the portable monitoring device collect the data used to determine the one or more characteristics; and transmit a command to the portable monitoring device configured to cause the portable monitoring device to implement the change to the at least one of the first period or the second period.

Some embodiments relate to a system comprising: one or more processors operably coupled to one or more memories and configured to monitor cargo during transportation of the cargo, the one or more processors configured to: periodically transmit a signal to a remote computing device via a network, the signal providing one or more characteristics relating to the cargo during transportation of the cargo; and change at least one of the following based on the one or more characteristics relating to the cargo: a first period at which the signal is transmitted by the portable monitoring device; or a second period at which one or more sensors of the portable monitoring device collect the data used to determine the one or more characteristics.

In some embodiments, the portable monitoring device comprises a battery, and changing at least one of the first period or the second period based on the one or more characteristics comprises changing at least one of the first period or the second period based at least in part on a charge condition of the battery.

In some embodiments, the portable monitoring device comprises circuitry configured to determine a location of the portable monitoring device, and changing at least one of the first period or the second period based on the one or more characteristics comprises changing at least one of the first period or the second period based at least in part on the location of the portable monitoring device. In some such embodiments, the method further comprises and/or the one or more processors are configured to perform operations including determining whether the portable monitoring device has entered a predetermined geographic area, and changing at least one of the first period or the second period based on the one or more characteristics comprises changing at least one of the first period or the second period in response to determining the portable monitoring device has entered the predetermined geographic area. In some such embodiments, changing at least one of the first period or the second period comprises at least temporarily suspending transmission of signals from the portable monitoring device to the remote computing device in response to determining the portable monitoring device has entered the predetermined geographic area.

In some embodiments, the portable monitoring device comprises a light sensor configured to measure an intensity of light, and changing at least one of the first period or the second period based on the one or more characteristics comprises changing at least one of the first period or the second period based at least in part on a change in a lighting condition.

In some embodiments, the portable monitoring device comprises a temperature sensor configured to monitor a temperature of the cargo, and wherein changing at least one of the first period or the second period based on the one or more characteristics comprises changing at least one of the first period or the second period based at least in part on a change in a temperature condition.

In some embodiments, the method further comprises and/or the one or more processors are configured to perform operations including determining at least one of a first amount of time elapsed since a beginning of transportation of the cargo, a first distance from a beginning location, a second amount of time to delivery of the cargo, or a second distance to a delivery destination, and changing at least one of the first period or the second period based on the one or more characteristics comprises changing at least one of the first period or the second period based on the at least one of the first amount of time, the first distance, the second amount of time, or the second distance.

In some embodiments, the method further comprises and/or the one or more processors are configured to perform operations including determining a type of the cargo, and changing at least one of the first period or the second period based on the one or more characteristics comprises changing at least one of the first period or the second period based on the type of the cargo.

Some embodiments relate to a method comprising: transmitting, by a first device configured to monitor cargo during transportation of the cargo, a first signal at a first power level to a second device configured to monitor the cargo; determining a first signal strength of the first signal received at the second device; determining, by the first device, whether the first signal strength is greater than a threshold signal strength; and setting, by the first device, a power level for transmission of one or more subsequent signals from the first device to the second device to a second power level lower than the first power level.

Some embodiments relate to a system comprising: one or more processors operably coupled to one or more memories and configured to monitor cargo during transportation of the cargo, the one or more processors configured to: transmit a first signal at a first power level to a second device configured to monitor the cargo; determine a first signal strength of the first signal received at the second device; determine whether the first signal strength is greater than a threshold signal strength; and set a power level for transmission of one or more subsequent signals to the second device to a second power level lower than the first power level.

In some embodiments, the method further comprises and/or the one or more processors are configured to perform operations including repeatedly lowering the power level until a signal strength of a signal received at the second device is below the threshold signal strength. In some such embodiments, the method further comprises and/or the one or more processors are configured to perform operations including increasing the power level after the signal strength is below the threshold signal strength. In some such embodiments, the method further comprises and/or the one or more processors are configured to perform operations including waiting for a delay period after determining the signal strength is below the threshold signal strength before increasing the power level. In some such embodiments, repeatedly lowering the power level comprises lowering the power level by a plurality of intervals, and wherein each interval is one of a fixed value or an value determined using the signal strength of the signal received at the second device.

In some embodiments, the first signal and the one or more subsequent signals comprise radio signals, and the first signal strength and the threshold signal strength comprise received signal strength indication (RSSI) values.

In some embodiments, determining the first signal strength of the first signal received at the second device comprises receiving data from the second device providing the first signal strength.

In some embodiments, the first device and the second device are configured to be positioned on or within a vehicle transporting the cargo. In some such embodiments, the first device and the second device each comprise one or more sensors and are configured to monitor at least one of a location or a temperature of the cargo.

Some embodiments relate to a method comprising: monitoring, by a first device configured to monitor cargo during transportation of the cargo, a first frequency channel within a range of frequencies during a first time period for signals from a second device configured to monitor the cargo; and monitoring, by the first device, a second frequency channel within the range of frequencies during a second time period for signals from a third device configured to monitor the cargo.

Some embodiments relate to a system comprising: one or more processors operably coupled to one or more memories and configured to monitor cargo during transportation of the cargo, the one or more processors configured to: monitor a first frequency channel within a range of frequencies during a first time period for signals from a second device configured to monitor the cargo; and monitor a second frequency channel within the range of frequencies during a second time period for signals from a third device configured to monitor the cargo.

In some embodiments, the first device is in a first mode during the first time period and the second time period, and the method further comprises and/or the one or more processors are configured to perform operations including placing the first device in a second mode during a third time period, wherein the first device is configured to use a lower level of power from a battery of the first device in the second mode than in the first mode.

In some embodiments, wherein the range of frequencies comprises a plurality of frequency channels, and the method further comprises and/or the one or more processors are configured to perform operations including periodically scanning all of the frequency channels within the range of frequencies to monitor for signals transmitted on the frequency channels.

In some embodiments, the method further comprises and/or the one or more processors are configured to perform operations including: receiving, by the first device, a first signal from the second device over the first frequency channel within the first time period, the first signal relating to a first characteristic of at least a portion of the cargo; receiving, by the first device, a second signal from the third device over the second frequency channel within the second time period, the second signal relating to a second characteristic of at least a portion of the cargo; and performing, by the first device, at least one of: transmitting data based at least in part on the first signal and the second signal to a remote computing device; or determining whether to transmit an alert to the remote computing device based at least in part on the first signal and the second signal.

Some embodiments relate to a method comprising: communicating, by a first device configured to monitor cargo during transportation of the cargo, with a second device configured to monitor the cargo through a first frequency channel within a range of frequencies; detecting interference on the first frequency channel; and switching, by the first device, a current frequency channel for communication between the first device and the second device to a second frequency channel within the range of frequencies in response to detecting the interference.

Some embodiments relate to a system comprising: one or more processors operably coupled to one or more memories and configured to monitor cargo during transportation of the cargo, the one or more processors configured to: communicate with a second device configured to monitor the cargo through a first frequency channel within a range of frequencies; detect interference on the first frequency channel; and switch a current frequency channel for communication with the second device to a second frequency channel within the range of frequencies in response to detecting the interference.

In some embodiments, detecting interference on the first frequency channel comprises detecting a level of interference above a threshold level, and switching the frequency channel comprises switching the frequency channel in response to detecting the level of interference above the threshold level.

In some embodiments, the range of frequencies comprises a plurality of frequency channels, and the method further comprises and/or the one or more processors are configured to perform operations including: determining, by the first device, an interference metric for each of the plurality of frequency channels, the interference metric indicating a level of interference in the frequency channel; and determining one or more frequency channels from among the plurality of frequency channels to which to switch the current frequency channel in response to detecting interference.

In some embodiments, the method further comprises and/or the one or more processors are configured to perform operations including determining a hierarchy of the one or more frequency channels using the interference metrics and determining a channel from among the one or more frequency channels to which to switch the current frequency channel in response to detecting interference based at least in part on the hierarchy.

In some embodiments, the method further comprises and/or the one or more processors are configured to perform operations including transmitting a message to the second device configured to cause the second device to switch from the first frequency channel to the second frequency channel for communication with the first device.

Some embodiments relate to a system configured to monitor cargo during transportation of the cargo, the system comprising: a first transceiver configured to wirelessly communicate with a first set of one or more external devices on a first frequency band, the first set of one or more external devices configured to monitor one or more characteristics of a first portion of the cargo; a second transceiver configured to wirelessly communicate with a second set of one or more external devices on a second frequency band, the second set of one or more external devices configured to monitor the one or more characteristics of a second portion of the cargo; and one or more processors operably coupled to one or more memories. The one or more processors are configured to: receive a first signal from the first transceiver and a second signal from the second transceiver; and perform at least one of the following: combine the first signal and the second signal and transmit the combined signal to a remote server; or process the first signal and the second signal to generate processed data and transmit a signal based at least in part on the processed data to the remote server.

Some embodiments relate to a method comprising: determining a first location using one or more cellular signals received by a portable monitoring device configured to monitor a location of cargo during transportation of the cargo; receiving, from a movement detection device of the portable monitoring device, a movement signal indicating whether the portable monitoring device is moving; and determining whether to include the first location within a set of one or more locations of the portable monitoring device using the movement signal.

Some embodiments relate to a system comprising: one or more processors operably coupled to one or more memories and configured to monitor a location of cargo during transportation of cargo using data received from a portable monitoring device, the one or more processors configured to: identify a first location associated with the portable monitoring device, the first location determined using one or more cellular signals received by the portable monitoring device; receive movement data indicating whether the portable monitoring device is moving, the movement data generated using a movement detection device of the portable monitoring device; and determine whether to include the first location within a set of one or more locations of the portable monitoring device using the movement signal.

Some embodiments relate to a portable monitoring device configured to monitor a location of cargo during transportation, the portable monitoring device comprising: a cellular transceiver configured to receive one or more cellular signals; a movement detection device configured to generate a movement signal indicating whether the portable monitoring device is moving; and circuitry configured to: determine a first location using the one or more cellular signals received by the cellular transceiver; receive the movement signal generated by the accelerometer; and determine whether to include the first location within a set of one or more locations of the portable monitoring device using the movement signal. The device further comprises an enclosure enclosing at least a portion of the cellular transceiver, the accelerometer, and the circuitry.

In some embodiments, the movement detection device comprises an accelerometer. In some such embodiments, determining whether to include the first location within the set of locations of the portable monitoring device comprises excluding the first location from the set of locations in response to determining the first location indicates movement from a prior location and the movement signal from the accelerometer indicates the portable monitoring device has not moved. In some such embodiments, the method further comprises and/or the one or more processors are configured to perform operations including determining the movement signal indicates the portable monitoring device has not moved in response to determining at least one of an amplitude or a duration of the movement signal is below a threshold value. In some such embodiments, determining whether to include the first location within the set of locations of the portable monitoring device comprises including a second location between a prior location and the first location in the set of locations in response to determining the movement signal from the accelerometer indicates a first amount of movement less than a second amount of movement indicated by the first location. In some such embodiments, the method further comprises and/or the one or more processors are configured to perform operations including determining a second location using the one or more cellular signals in response to determining the first location indicates a first amount of movement from a prior location under a threshold amount of movement and the movement signal from the accelerometer indicates the portable monitoring device was moving.

In some embodiments, determining the first location using the one or more cellular signals received by the portable monitoring device comprises determining the first location based on cellular triangulation of a plurality of cellular signals using a received signal strength indication (RSSI) of each of the plurality of cellular signals.

Some embodiments relate to a method comprising: monitoring a temperature measured by a temperature sensor of a portable monitoring device configured to monitor cargo during transportation of the cargo; generating a first alert in response to determining the temperature has exceeded a first threshold value; and generating a second alert based on at least one of: the temperature exceeding a second threshold value greater than the first threshold value; or at least one of a time the temperature exceeds the first threshold value or an amount by which the temperature exceeds the first threshold value.

Some embodiments relate to a system comprising: a temperature sensor; and one or more processors operably coupled to one or more memories and configured to monitor cargo during transportation of the cargo, the one or more processors configured to: monitor a temperature measured by a temperature sensor; generate a first alert in response to determining the temperature has exceeded a first threshold value; and generate a second alert based on at least one of: the temperature exceeding a second threshold value greater than the first threshold value; or at least one of a time the temperature exceeds the first threshold value or an amount by which the temperature exceeds the first threshold value.

Some embodiments relate to a system comprising: one or more processors operably coupled to one or more memories and configured to communicate with a portable monitoring device configured to monitor cargo during transportation of the cargo, the one or more processors configured to: receive a signal from the portable monitoring device indicating a temperature measured by a temperature sensor; generate a first alert in response to determining the temperature has exceeded a first threshold value; and generate a second alert based on at least one of: the temperature exceeding a second threshold value greater than the first threshold value; or at least one of a time the temperature exceeds the first threshold value or an amount by which the temperature exceeds the first threshold value.

In some embodiments, the first threshold value comprises a temperature range between a low temperature value and a high temperature value, and determining the temperature has exceeded the first threshold value comprises determining the temperature is either higher than the high temperature value or lower than the low temperature value of the temperature range.

In some embodiments, the first alert comprises a warning that the temperature has exceeded the first threshold value, and the second alert comprises a critical alert that the cargo is at risk of damage due to the temperature.

In some embodiments, generating the second alert comprises generating the second alert in response to determining the temperature exceeds the second threshold value.

In some embodiments, generating the second alert comprises generating the second alert in response to determining a time duration during which the temperature exceeds the first threshold value exceeds a threshold time duration.

In some embodiments, generating the second alert comprises generating the second alert based on a combination of a time duration during which the temperature exceeds the first threshold value and an amount by which the temperature exceeds the first threshold value.

In some embodiments, the method further comprises and/or the one or more processors are configured to perform operations including determining a cumulative time duration during which the temperature exceeds the first threshold value over a time period, and generating the second alert comprises generating the second alert in response to determining the cumulative time duration exceeds a threshold cumulative time duration. In some such embodiments, the time period is a time during which the cargo is transported from a first location to a second location.

In some embodiments, the method further comprises and/or the one or more processors are configured to perform operations including determining at least one of a first time period during which the cargo is being cooled to a target temperature or a second time period after the cargo reaches a destination location; and suppressing generation of the first alert and the second alert during the at least one of the first time period or the second time period.

Some embodiments relate to a method comprising: monitoring a temperature measured by a temperature sensor of a portable monitoring device configured to monitor cargo during transportation of the cargo; generating an alert in response determining the temperature has exceeded a threshold value; transmitting the alert to a first recipient; determining whether an acknowledgement of receipt of the alert is received from the first recipient within a time period; and transmitting the alert to a second recipient in response to determining the acknowledgement of receipt is not received within the time period.

Some embodiments relate to a system comprising: a temperature sensor; and one or more processors operably coupled to one or more memories and configured to monitor cargo during transportation of the cargo, the one or more processors configured to: monitor a temperature measured by the temperature sensor; generate an alert in response determining the temperature has exceeded a threshold value; transmit the alert to a remote computing device configured to provide the alert to a first recipient; determine whether an acknowledgement of receipt of the alert is received from the first recipient within a time period; and retransmit the alert to the remote computing device in response to determining the acknowledgement of receipt is not received within the time period, the remote computing device configured to provide the alert to a second recipient.

Some embodiments relate to a system comprising: one or more processors operably coupled to one or more memories and configured to communicate with a portable monitoring device configured to monitor cargo during transportation of the cargo, the one or more processors configured to: monitor a temperature measured by a temperature sensor of the portable monitoring device; generate an alert in response determining the temperature has exceeded a threshold value; transmit the alert to a first recipient; determine whether an acknowledgement of receipt of the alert is received from the first recipient within a time period; and transmit the alert to a second recipient in response to determining the acknowledgement of receipt is not received within the time period.

In some embodiments, the method further comprises and/or the one or more processors are configured to perform operations including setting the time period after which the alert is transmitted to the second recipient based at least in part on a time duration during which the temperature exceeds the threshold value and an amount by which the temperature exceeds the threshold value. In some such embodiments, the alert comprises one of a first alert or a second alert, the first alert is generated in response to determining the temperature has exceeded a first threshold value, and the method further comprises and/or the one or more processors are configured to perform operations including: generating a second alert based on at least one of: the temperature exceeding a second threshold value greater than the first threshold value; or at least one of a time the temperature exceeds the first threshold value or an amount by which the temperature exceeds the first threshold value; and setting the time period after which the alert is transmitted to the second recipient based at least in part on whether the alert is the first alert or the second alert.

In some embodiments, the method further comprises and/or the one or more processors are configured to perform operations including determining a hierarchical list of recipients to receive alerts; and iteratively providing the alert to recipients within the hierarchical list in response to determining an acknowledgement of receipt of the alert is not received from a last recipient within the time period.

BRIEF DESCRIPTION OF THE DRAWINGS

The disclosure will become more fully understood from the following detailed description, taken in conjunction with the accompanying figures, wherein like reference numerals refer to like elements, in which:

FIGS. 16A-D are example maps illustrating vehicle movements using the systems and methods described herein, according to an exemplary embodiment.

DETAILED DESCRIPTION

Figure 1:
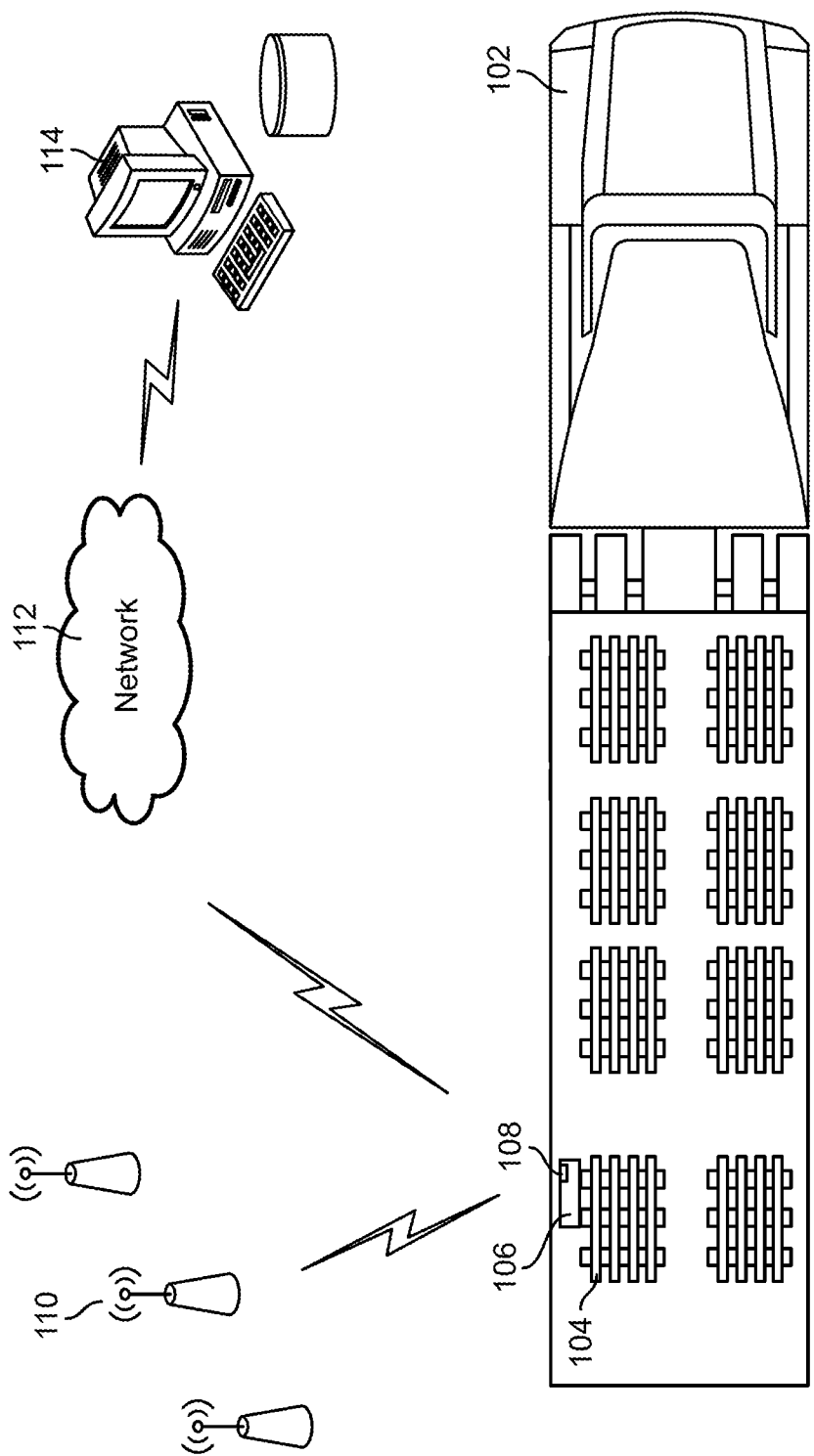
FIG. 1 is a diagram illustrating a portable monitoring device in a vehicle transmitting signals to a remote server, according to an exemplary embodiment.

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Referring generally to the figures, systems and methods relating to the construction, operation, and/or use of portable monitoring devices in a transport vehicle are shown and described. Features of various embodiments of the present disclosure include, but are not limited to: (1) monitoring location, temperature, and/or other characteristics of cargo using a single device that may be designed to be disposed of at the end of one or more trips; (2) generating alerts based on a variety of temperature conditions, such as multiple temperature thresholds; (3) providing multiple levels of alerts and escalating alerts to different users (e.g., on-call individual, supervisor, etc.); (4) providing an indication of an end of trip, beginning of trip, and/or one or more checkpoints based on location data and data from one or more sensors; (5) reducing power of transmissions between devices to reduce battery consumption; (6) using frequency diversity features to communicate between devices (e.g., using multiple frequency channels within a band and/or switching channels in response to interference); (7) providing configurable reporting and/or sensor monitoring parameters, and changing a period for reporting information from a portable monitoring device to a remote device (e.g., server) and/or periods in which measurements are taken by sensors in response to changing characteristics, such as location, battery life, etc.; (8) providing features allowing for communication with devices across multiple frequency bands; (9) utilizing one or more secondary communication circuits (e.g., secondary radios) to communicate with different devices, such as across different frequency channels and/or bands; and (10) using a movement detection device (e.g., an accelerometer) in combination with location data from another source (e.g., cellular triangulation) to confirm movement and/or reduce false indications of movement.

The portable monitoring devices may be used to monitor cargo (e.g., goods, which may include any type of item, such as perishable or high-value goods) being transported in the transport vehicle. The portable monitoring devices may provide alerting services based on the condition of the goods or the status of the trip or transport vehicle. In some embodiments, the portable monitoring system may provide motion detection features that allow the device or a remote device (e.g., remote server) to track the location of the transport vehicle and goods. The portable monitoring devices may monitor their power supply (e.g., battery) and adjust its operation based on the power supply, in some embodiments.

The portable monitoring device may transmit data (e.g., location data, sensor data, etc.) to a remote server configured to track the location and/or other characteristics of the vehicle and/or cargo. The remote server may provide an interface through which users, such as a shipper, receiver, or other party, may view current and/or previous locations of the vehicle and the status of the goods. In some embodiments, the portable monitoring device and/or server may provide on-demand and/or real-time information on the goods.

In some embodiments, the portable monitoring device may be designed to be discarded or recycled at the end of a trip, such that the device can be used to monitor cargo during transport without maintaining the device after the end of the trip. In some such embodiments, the device may include relatively inexpensive electronics (e.g., sensors, processor, memory, etc.), and a substantial amount of the processing functionality may be performed at a remote server. For example, the device may include the electronics used to take measurements relating to the cargo and/or vehicle (e.g., temperature of the cargo, location of the vehicle, etc.) and transmit the measurements to the remote server. The remote server may include the functionality to process the measurements and perform actions based on the processing, such as providing alerts. In some implementations, the remote server may transmit commands back to the portable device based on the processing causing the device to change one or more settings. Implementations in which the portable monitoring device is discardable or recyclable may provide ease of use, such that the user of the device does not have to reconfigure and/or maintain the device across multiple trips. Instead, in some implementations, the user can just obtain a device, activate it, attach it to the cargo/vehicle, use it to monitor a shipment, and discard or recycle the device after the end of the trip.

Various embodiments of the present disclosure include features relating to temperature monitoring, alerting, and/or end-of-trip confirmations for cargo being transported in a transport vehicle. It has become increasingly important to shippers, receivers, and carriers of goods to be able to track the location and characteristics of the goods during and/or after transportation. For example, the U.S. Food and Drug Administration ("FDA") recently promulgated a rule change crafted in response to the Food Safety Modernization Act signed into law in 2011. The rule change requires carriers or shippers to monitor temperature conditions during the transportation operation. Tracking temperature helps ensure the safety and quality of perishable goods, for example, does not diminish during transportation from one location to another, and helps reduce instances of food-borne illness.

The FDA rule change provides that the temperature can be monitored by a temperature recording device or a log of temperature measurements made at various times during the shipment. However, carriers typically do not enter into the process relating to monitoring and recording temperatures unless asked to check on the product. Shippers and/or receivers may prefer that the carrier not unnecessarily enter the cargo area of the transportation vehicle to avoid fluctuations in temperature and/or tampering with the goods. Further, many receivers forbid the carrier (e.g., truck driver) from climbing onto a dock area due to insurance and safety regulations, which can make it difficult for the carrier to access a temperature logger attached to or inside the cargo area of the vehicle.

In some embodiments, the portable monitoring device tracks the temperature inside the transport vehicle. Some of the goods transported by the transport vehicle may be temperature-sensitive (e.g., food), and if the temperature is above or below a certain threshold, the goods may be compromised. The portable monitoring device may include a temperature sensor configured to sense the current temperature, and the temperature data may be used to generate a warning or alert that the current temperature level may be hazardous to the goods. In various embodiments, different levels of alerts may be generated based on the temperature level (e.g., a first value which causes a first warning to be generated and a second critical value that causes a higher priority warning to be generated), the amount of time spent above a threshold temperature level, and the like.

In some embodiments, the portable monitoring device may be configured to provide multiple-level alerting. In multiple-level alerting, the portable monitoring device may first provide an alert (e.g., a high temperature warning) to a first recipient via the remote server (e.g., a user monitoring the transport vehicle through data provided to a device of the user by the remote server, such as through a web-based interface, an application on the user device, etc.). If the remote server and portable monitoring device do not receive a confirmation or other input from the user, an alert may then be transmitted to a second recipient (e.g., a supervisor of the user). The alert to the second recipient may be generated based on an amount of time waiting for confirmation from the first recipient or the nature of the alert. For example, if a high temperature alert is generated, and the duration of the high temperature condition exceeds a threshold, or the temperature level exceeds a second threshold, then an alert may be transmitted to the second recipient. In other words, the alert may be transmitted to the second recipient in addition to the first recipient when the alert reaches a critical level (e.g., a critical temperature). In some embodiments, the remote server may determine and maintain a hierarchical list of recipients to provide the alerts (e.g., which recipients should receive all alerts, which recipients should only receive critical alerts, etc.).

In some embodiments, the portable monitoring device may be configured to determine an end of trip of the transport vehicle, and to provide an indication to the remote server. The end of trip may be detected using one or more sensors of the portable monitoring device and the location of the transport vehicle. The location of the transport vehicle may be determined based received cellular transmissions from one or more cell towers, in some embodiments. The signal strength of the transmissions may be used to estimate the transport vehicle location.

In some embodiments, the portable monitoring device includes an ambient light sensor. If the light level suddenly increases inside the transport vehicle, then the doors of the vehicle may be open. If the location data indicates that the transport vehicle has arrived at its destination, or is within a geographic area around the destination, the portable monitoring device may determine an end of trip status. In some embodiments, the temperature sensor may be used. If the temperature rises above a threshold value, and the location data indicates that the transport vehicle has arrived at its destination (and that the goods are being moved from the vehicle to a warmer area), then the portable monitoring device may determine an end of trip status. In some embodiments, the portable monitoring device includes an accelerometer. If the accelerometer measures no vibration (e.g., the vehicle is not in motion), and the transport vehicle has arrived at its destination, or is within a geographic area around the destination, the portable monitoring device may determine an end of trip status. In some embodiments, a combination of multiple sensors inputs may be used to help increase the reliability of the end of trip determination. Using sensor input in addition to location may help reduce false indications of end of trip, such as when a truck reaches an area near or at a destination but is sitting idle in a parking lot for an extended time waiting for a spot on a dock to open up to actually end the trip and offload the cargo.

Upon detecting the end of trip status, the portable monitoring device may change operation. For example, a subscriber identity module (SIM) card coupled to the cellular transceiver of the portable monitoring device may be deactivated, since there is no more need for transmissions. This may help reduce cost due to the SIM card being active while it is no longer being used. Further, temperature measurement and/or reporting (and other sensor measurement and reporting) may be disabled or suppressed upon the end of the trip, in some embodiments. This may help prevent an increase in temperature while the cargo is being unloaded from affecting temperature data reported for the trip (e.g., an average temperature over the course of the trip). In some embodiments, the portable monitoring device may further provide a beginning of trip indication and/or in indication of arriving at and/or leaving one or more checkpoints during the trip using the location data and sensor data as described above, and the portable monitoring device and/or a remote server may disable, suppress, or otherwise process sensor inputs in response to the indication.

Various exemplary embodiments of the present disclosure additionally or alternatively provide features relating to power conservation of the portable monitoring device. In some embodiments, the portable monitoring device is powered by a battery or other internal power supply that powers the portable monitoring device without an external power supply for at least a portion of a trip. The internal power supply may deplete over time. If utilization of the internal power supply is not managed appropriately, power may not last through a duration of one or more trips (e.g., until the portable monitoring device can be replaced or recharged).

Power conservation features may be implemented to efficiently utilize battery life so the portable monitoring device can remain powered through the duration of a trip. For example, the portable monitoring device may monitor the power needed to transmit signals to a remote server. The portable monitoring device may transmit signals to the remote server on a schedule (e.g., every 15 minutes, every hour, when a warning or alarm is generated by the portable monitoring device, etc.). In some embodiments, the portable monitoring device may estimate how many transmissions the device needs to make until the transport vehicle reaches a destination, and how much power is required for the transmissions. If the power required is greater than the power remaining in the battery, adjustments may be made to the transmission schedule, transmission power, and/or the frequencies used for transmissions in order to ensure that the battery lasts for the duration of the trip.

In some embodiments, transmission power of the portable monitoring device may be adjusted to conserve battery life. For example, the portable monitoring device may communicate with other portable monitoring devices or remote sensors configured to monitor different portions of the cargo (e.g., sensors mounted on other pallets). The transmission power of transmissions made from the portable monitoring device to the other devices may be lowered gradually until the transmission power reaches a low level suitable for the remaining power supply.

In some embodiments, the portable monitoring device may be configured to support frequency diversity. The portable monitoring device may use multiple frequencies within a range of frequencies to communicate with other devices. The portable monitoring device may monitor several frequency channels within a range of frequencies (e.g., frequency band) that the portable monitoring device can use to transmit signals to other devices, and may transmit on one or more channels that require the least power to transmit and be effectively received by the other devices.

In some embodiments, the portable monitoring device may adjust one or more reporting and/or monitoring periods associated with the portable monitoring device. The portable monitoring device may include various sensors and/or communication interfaces, such as a cellular transceiver used to communicate with other devices (e.g., a remote server) and/or determine a position of the portable monitoring device, an accelerometer configured to detect transport vehicle movement, a temperature sensor configured to detect the current temperature in the vehicle, and/or other sensors to determine the current environment and condition of the goods being transported. The sensors may be used to determine when a warning or alert should be generated (e.g., conditions may be hazardous to the goods, something unexpected is happening to the goods, etc.) and may be used to locate the transport vehicle and report the location and/or conditions/alerts to a remote server.

Location data, sensor data, and/or alerts may periodically be transmitted to a remote server. In some embodiments, the server and/or monitoring device may change the reporting period based on battery life, for example, in response to estimating a remaining battery life will not last for the remaining duration of a trip. The server and/or monitoring device could also revise the reporting period based on other factors, such as location of the monitoring device (e.g., determining the device is at a port or on a ship) and/or one or more transmission rules (e.g., determining the device is at an airfield and should not transmit cellular signals during a flight). In some embodiments, the portable monitoring device could adjust an interval at which sensors take measurements and/or other parameters of the sensors based on similar factors. For example, the portable monitoring device may monitor the power consumption related to sensor activity, and may adjust sensor activity to conserve power. If the sensors are capturing data at a rate that will deplete the power supply before the goods reach their destination, the portable monitoring device may capture sensor data less often. As another example, the portable monitoring system may reduce power supplied to the sensors, or may modify sensor parameters to allow the sensor to operate with less power.

Various exemplary embodiments of the present disclosure additionally or alternatively provide features relating to the tracking of transport vehicle movement. One difficulty in monitoring the location of goods being transported is accurately locating the transporting vehicle and goods. For example, assume that a truck is driving and the location of the truck is being tracked via a portable monitoring device. The portable monitoring device may transmit location data to a remote server configured to track the truck and goods. The remote server may provide an interface through which users, such as a shipper, receiver, or other party, may view one or more current and/or previous locations of the truck.

The location data may include, for example, data generated based on cellular signals received at the portable monitoring device. Using the data, cellular triangulation may be used to approximate the location of the vehicle. Cellular triangulation generally provides a reliable location estimate for the monitoring device that is sufficiently granular for the purposes of tracking the location of the truck in most situations. In some embodiments, by using a cellular transceiver to estimate location, the monitoring device can avoid using separate devices dedicated to location tracking, such as GPS receivers. Such separate location-determining devices can increase the cost and size of the portable monitoring device and decrease the battery life of the device. Additionally, some such devices, such as GPS receivers, may not reliably determine location if placed in an enclosed space, such as in an enclosed cargo area of a truck. Accordingly, utilizing the cellular transceiver for location determination can reduce cost and size of the device and allow the device to operate for a longer time period on a battery charge. In some embodiments, the monitoring device may use the cellular transceiver for both location tracking as well as communicating with the server (e.g., by relaying messages to the server through one or more cell towers).

In some situations, the cellular transceiver may not provide a reliable estimate of the location of the monitoring device. For example, the cellular transceiver may detect movement of the truck when little or no movement is actually occurring. This may occur for a variety of reasons. For example, environmental conditions between one or more cell towers used to perform triangulation and the monitoring device can change over time, and can affect the signals received by the monitoring device used to estimate location. In another example, a cell tower initially used for location estimation might go offline, and the data received from a new tower used to subsequently estimate location can result in a different estimated location than the estimate based on the original cell tower. The effect can be referred to as "spidering," and can result in the location data displayed to the user appearing to bounce around in a scattered pattern around the actual location of the vehicle (e.g., similar to a spider web). Spidering can result in display clutter when the location data is displayed to a user, and can give the user a false impression that the vehicle is moving when it is not.

The systems and methods described herein may more reliably detect movement by use of an accelerometer to sense acceleration forces within the vehicle. In some embodiments, the portable monitoring device includes an accelerometer used to assist with detection of transport vehicle movement. The accelerometer is generally configured to sense acceleration forces, and can detect if the transport vehicle is in motion or not. In some embodiments, the accelerometer reports duration and/or intensity of vibration to the portable monitoring device. The vibration data may be used to determine if the vehicle is moving, and the rate (e.g., relative rate of speed) at which the vehicle is moving. In some embodiments, the portable monitoring device reports both cellular location data (e.g., based on cellular triangulation) and accelerometer data (e.g., vibration data) to a remote server that is configured to calculate the location of the transport vehicle using the location and accelerometer data from the portable monitoring device. For example, in some embodiments, the server is configured to disregard or modify some of the location data using the accelerometer data (e.g., where the cellular location data indicates movement but the accelerometer data indicates the vehicle was stopped). In some embodiments, the portable monitoring device may process the location data using the accelerometer data prior to transmitting the location data to the server. In some embodiments, a different movement sensing device than an accelerometer may be utilized for a similar purpose.

In some situations, the transport vehicle may be stopped. The accelerometer would report no, or very little, vibration to the portable monitoring device. In response to the accelerometer data, the monitoring device and/or remote server may conclude that the transport vehicle is not moving. If the location data (e.g., cellular data) indicates movement, the monitoring device and/or remote server may disregard a portion of the location data, and may rely on one or more historical location values as the current location of the monitoring device.

In other situations, the transport vehicle may be in motion. The accelerometer would report vibration to the server controller of the monitoring device and/or the remote server. The monitoring device and/or remote server may use the amplitude and/or duration of the vibration to estimate an amount (e.g., relative amount) of movement of the vehicle. If the movement determined using the accelerometer data is inconsistent with the movement reflected in the location data (e.g., if the location data suggests movement greater than that suggested by the accelerometer data), the monitoring device and/or remote server may modify the location data to dampen the movement determined based, for example, on cellular triangulation. This may result in a displayed movement pattern that is more accurate to the actual movement of the vehicle, and may help reduce any "spidering" effect.

In some embodiments, the RF sensitivity of the transceiver of the portable monitoring device may be improved by deliberately detuning the antenna resonance. In a typical RF transceiver design, the match between the antenna and low noise amplifier is optimized for selective operating frequencies in a free space environment. The resultant match tends to be of a high Q which is sensitive to environmental loading factors. In an effort to mitigate this load sensitivity, the antenna to low noise amplifier match may be deliberately detuned to yield a lower Q network that is not as sensitive to environmental load by may have a lower performance as measured in a free space environment.

Referring now to FIG. 1, a transport vehicle 102 is shown transporting goods 104. A portable monitoring device 106 is shown in transport vehicle 102 and is configured to be in communications with a remote server 114 via network 112 and cell towers 110. Remote server 114 may then use signals transmitted by portable monitoring device 106 and relayed by cell towers 110 to, for example, determine the location of transport vehicle 102. In some embodiments, as shown in FIG. 1, portable monitoring device 106 is coupled to goods 104 (e.g., fastened to a box housing the transported goods, to a pallet on which the goods are placed, affixed to the goods themselves, etc.). In some embodiments, portable monitoring device 106 may be configured to operate within an enclosed space of vehicle 102, such as a cargo area or enclosure. In other embodiments, portable monitoring device 106 is coupled to transport vehicle 102 in any other location, and may or may not be physically attached to goods 104. It should be understood that the positioning of portable monitoring device 106 in transport vehicle 102 may vary without departing from the scope of the present disclosure.

Portable monitoring device 106 may include one or more sensors 108 coupled to and/or housed within the portable monitoring device. Sensors 108 may include an accelerometer, temperature sensor, ambient light sensor, or any other sensor configured to sense the condition or environment surrounding goods 104. The sensors may generally be used to, for example, measure a temperature of cargo or near the cargo, to sense changes in the intensity of light in the cargo area (to determine if a cargo door is open), and to sense acceleration forces (to determine if vehicle 102 is in motion). In the embodiment of FIG. 1, sensors 108 are shown housed within portable monitoring device 106; in other embodiments, sensors 108 may be located in any other position within transport vehicle 102, and may or may not be integrated with portable monitoring device 106 (e.g., sensors 108 may communicate wirelessly with portable monitoring device 106 via a wireless connection).

Portable monitoring device 106 is shown communicating with remote server 114 via a network 112 and multiple cellular towers 110. Network 112 may be or include any type of network (e.g., a cellular network or other a radio communication network, a WAN, a LAN, etc.) configured to transmit information between portable monitoring device 106 and remote server 114 via one or more of a variety of communications protocols. Multiple cell towers 110 are shown which transmit cellular signals to portable monitoring device 106, which can be used to estimate the location of portable monitoring device 106. In some embodiments, cellular triangulation is used to estimate the location of portable monitoring device 106. While cell towers 110 are shown in FIG. 1, it should be understood that, in some embodiments, other types of equipment (e.g., GPS satellites, other satellites) may be used, alone or in combination with the cellular signals, to estimate the location of device 106 in the illustrated system.

Figure 2:
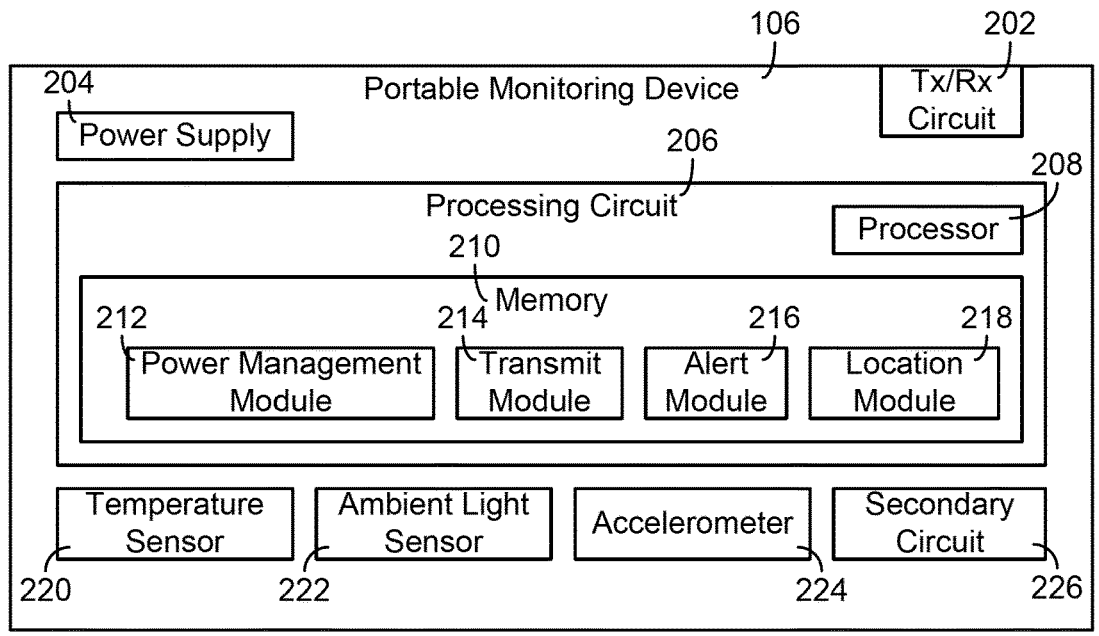
FIG. 2 is a detailed block diagram of the portable monitoring device of FIG. 1, according to an exemplary embodiment.

Referring now to FIG. 2, a detailed block diagram of portable monitoring device 106 is shown, according to exemplary embodiments. Portable monitoring device 106 is shown to generally include a transmit/receive circuit 202 configured to facilitate wireless communications with, for example, remote server 114 and cell towers 110. Transmit/receive circuit 202 may include, for example, a cellular transceiver configured to receive cellular signals from cell towers 110 and transmit cellular signals to cell towers 110.

Portable monitoring device 106 further includes one or more sensors configured to provide sensor data, which can be used by portable monitoring device 106 and remote server 114 for generating alerts, monitoring goods, adjusting power management settings, and the like. For example, portable monitoring device 106 may include a temperature sensor 220 for detecting a current temperature level in transport vehicle 102. Temperature sensor 220 may sense the temperature at a given time interval or schedule (e.g., every five minutes, every fifteen minutes, etc.). Temperature sensor data may then be used to determine if a current temperature level may compromise goods 104 (e.g., frozen or refrigerated food in a warm environment), if a refrigeration system of transport vehicle 102 is malfunctioning, etc.

As another example, portable monitoring device 106 may include an ambient light sensor 222. Ambient light sensor 222 may sense ambient light inside of transport vehicle 102. If a door of transport vehicle 102 is opened, ambient light sensor 222 may sense the increased ambient light inside the vehicle, and the resulting sensor data may be used to indicate that a user at the destination has opened the door, that the door should not be open and something is wrong, and the like. Ambient light sensor 222 may be configured to sense an increase or decrease in ambient light when it occurs, or may be configured to sense ambient light at a given time interval or schedule (e.g., every five minutes, every fifteen minutes, etc.).

As another example, portable monitoring device 106 may include an accelerometer 224. Accelerometer 224 may sense acceleration forces to determine if transport vehicle 102 is in motion or not. In some embodiments, accelerometer 224 may generate signals representative of a sensed vibration. The signals may be indicative of a duration and/or amplitude/intensity of vibration. The vibration data of accelerometer 224 may be used to determine the rate at which transport vehicle 102 is moving (e.g., relative or absolute rate), based on the duration and/or intensity of vibration detected. In other embodiments, accelerometer 224 may generate other signals indicative of movement, such as g-force data, orientation data, shock data, etc. Portable monitoring device 106 may further include various other sensors, and a sensor interface for communicating via a wired or wireless connection with sensors located remotely from portable monitoring device 106.

Portable monitoring device 106 is shown to include a processing circuit 206 including a processor 208 and memory 210. With respect to FIG. 3, remote server 114 is shown to include a processing circuit 304 including a processor 306 and memory 308. Processors 208, 306 may be general purpose or specific purpose processors, application specific integrated circuits (ASIC), one or more field programmable gate arrays (FPGAs), a group of processing components, or other suitable processing components. Processors 208, 306 may be configured to execute computer code or instructions stored in memories 210, 308 or received from other computer readable media (e.g., CDROM, network storage, a remote server, etc.) to perform one or more of the processes described herein. Memories 210, 308 may include one or more data storage devices (e.g., memory units or devices) configured to store data, computer code, executable instructions, or other forms of computer-readable information. Memories 210, 308 may include random access memory (RAM), read-only memory (ROM), hard drive storage, temporary storage, non-volatile memory, flash memory, optical memory, or any other suitable memory for storing software objects and/or computer instructions. Memories 210, 308 may include database components, object code components, script components, or any other type of information structure for supporting the various activities and information structures described in the present disclosure. Memories 210, 308 may be communicably connected to processors 208, 306 via processing circuits 206, 304 and may include computer code for executing (e.g., by processors 208, 306) one or more of the processes described herein.

Referring again to FIG. 2, memory 210 is shown to include various modules for controlling the operation of portable monitoring device 106. Power management module 212 is configured to control the activity of portable monitoring device 106 for power conservation and/or communication management purposes. For example, portable monitoring device 106 includes a power supply 204, which may generally be or include a battery or other power source that may become depleted over time. Power management module 212 may adjust the activities of portable monitoring device 106 based on the power supply 204 remaining in the device and on general power usage of portable monitoring device 106. For example, the activities of portable monitoring device 106 may be adjusted to ensure that enough power remains for the duration of a scheduled trip. Such activities may include a transmission schedule (e.g., adjusting a schedule to cause the device to transmit a signal once every four hours instead of once every hour). Such activities may further include continuously monitoring the battery level and increasing or decreasing the transmission power of the device based on the remaining battery level. Power management module 212 is described in greater detail in FIG. 9.

Transmit module 214 is configured to control transmissions of portable monitoring device 106 via transmit/receive circuit 202. For example, in some embodiments, transmit module 214 may receive sensor data and transmit the sensor data along with signal data (e.g., data representing one or more characteristics of the received cellular signals) and/or other device data for transmission to remote server 114. In some embodiments, the sensor data can be processed at transmit module 214 or more generally portable monitoring device 106 to determine the location of portable monitoring device 106. In other embodiments, the sensor data is transmitted by remote server 114, which may then determine the location of portable monitoring device 106.

Transmit module 214 may be configured to generate a transmission on a schedule (e.g., once every ten minutes, once every hour, etc.). Transmit module 214 may modify the transmission schedule based on various factors. For example, transmit module 214, alone or in coordination with power management module 212, may vary the transmission power of transmissions sent to remote server 114 (e.g., if the power supply is running low, if an warning is being transmitted, if an end of trip situation is detected), or may use different frequency channels for transmissions to different devices. As another example, the transmission schedule may be modified based at least in part on a remaining battery life. As another example, if vehicle movement is not detected by accelerometer 224, transmit module 214 may transmit signals less often. As another example, the transmission schedule may be adjusted based on the location of portable monitoring device 106 (e.g., if the vehicle is a boat and the location is a body of water, the device may transmit signals less often). In some embodiments, the goods in transit may switch transport vehicles (e.g., from a truck to boat or vice versa, from one truck to another), and transmit module 214 may use information relating to the switch of vehicles to adjust the transmission schedule.

Alert module 216 is configured to generate an alert or warning based on a current condition relating to transport vehicle 102. For example, alert module 216 may receive a temperature reading from temperature sensor 220 and determine that the temperature is hazardous to the goods. Alert module 216 may then generate a signal to be transmitted to remote server 114. As another example, alert module 216 may receive an indication of increased ambient light from ambient light sensor 222, and determine that an alert should be generated (e.g., because increased ambient light would indicate the opening of a door that should not be open). As another example, alert module 216 may receive a low power indication from power management module 212, and may provide the indication to remote server 114. Further, alert module 216 may provide an indication to if (and how) the operation of portable monitoring device 106 changed in response to the low power situation. In some embodiments, alert module 216 may generate an alert based on a determination by location module 218 that a current location of device 106 is within, or has just entered or left, one or more defined geographic areas (e.g., areas around a starting location, destination, one or more checkpoint locations, ports, etc.). The activities of alert module 216 are described in greater detail in FIG. 4.

Location module 218 is configured to determine, alone or in combination with remote server 114, a current location of portable monitoring device 106 and transport vehicle 102. In some embodiments, location module 218 receives cellular signals from a plurality of cell towers 110 and uses the signals to calculate a location of the vehicle. For example, location module 218 may use cellular triangulation using the three cell towers providing the strongest signal to portable monitoring system 106. Location module 218 may determine characteristics of the cell signals and use the characteristics to calculate the location. For example, location module 218 may calculate a received signal strength indication (RSSI) of the signals and use the RSSI to calculate the location of transport vehicle 102 (e.g., based on a determination that stronger signals indicate a closer proximity to a known location of a cell tower, and weaker signals indicate a farther proximity from the cell tower). In some embodiments, cellular signal characteristics other than RSSI may be used alone or in combination with RSSI.

In some embodiments, location module 218 may use other types of transceivers or sensors to help determine a location of portable monitoring device 106, alone or in combination with cellular signals. For example, portable monitoring device 106 may include a GPS transceiver configured to receive one or more GPS signals and determine a position of device 106 using the signals. In some embodiments, portable monitoring device 106 may include a WiFi transceiver, Bluetooth transceiver, RFID transceiver, or other long or short-range communication interface, and may determine a position of portable monitoring device 106 using the data received via such communication interfaces. In some embodiments, portable monitoring device 106 may use cellular signals as a primary source for determining the position of device 106, and may use location data received from other secondary sources to confirm and/or refine the location determined using the cellular signals.

In some embodiments, location module 218 may calculate the estimated location of transport vehicle 102, and the estimated location may be transmitted to remote server 114. In another embodiment, location module 218 may determine or retrieve signal characteristics based on transmissions from cell towers 110, and provide the signal characteristics to remote server 114. Remote server 114 may then calculate the estimated location of transport vehicle 102.

In some embodiments, location module 218 may determine if transport vehicle 102 has moved since a previous time that the location of transport vehicle 102 was determined. For example, location module 218 may use accelerometer data to determine if transport vehicle 102 has moved. Accelerometer data may indicate a vibration amplitude and duration that was sensed by accelerometer 224. Location module 218 may determine if the amplitude and/or duration of the vibration exceeds a threshold indicating movement (e.g., indicating that transport vehicle 102 was in motion since the last location update. As another example, location module 218 may determine the location and identity of cell towers 110 providing the signal to portable monitoring device 106. Location module 218 may compare the cellular towers used to provide the previous transmission and the current transmission. If one or more cellular towers are different, then it may be determined that transport vehicle 102 moved because at least one different cellular tower provided a stronger signal to portable monitoring device 106. In some embodiments, location module 218 may compare signal characteristics, such as RSSI values, to corresponding characteristics from previously received signals, and if the characteristics change by at least a threshold value, location module 218 may determine device 106 has moved. In some embodiments, as described in further detail below, location module 218 may determine whether movement has occurred based on a combination of both the cellular signals and movement data from an accelerometer or other movement detection device. In some embodiments, location module 218 may transmit cellular signal characteristic data and movement data from accelerometer 224 to remote server 114, and remote server 114 may determine whether or not movement of device 106 has occurred.

In some embodiments, portable monitoring device 106 may include a secondary communication circuit 226 configured to enable communication with one or more other devices (e.g., other portable monitoring devices) in proximity to the device 106 (e.g., devices in the same vehicle, on or in one or more other adjacent vehicles carrying related cargo). Portable monitoring device 106 may include a secondary radio transceiver configured to communicate with devices using a short, medium, or long-range communication protocol. One or more of various communication protocols may be utilized, such as Bluetooth, WiFi, etc. In some embodiments, a communication protocol such as those based on the IEEE 802.15.4 standard may be utilized. In some embodiments, a proprietary communication protocol may be utilized. In some embodiments, secondary communication circuit 226 may be separate from transmit/receive circuit 202. In some embodiments, secondary communication circuit 226 may be integrated with transmit/receive circuit 202 (e.g., such that transmit/receive circuit 202 includes one or more circuits capable of communicating both with local devices and with cell towers 110).

In some embodiments, secondary communication circuit 226 may be configured to communicate with devices across multiple frequency bands or channels. For example, secondary communication circuit 226 may include a first transceiver configured to communicate with devices on a first frequency band (e.g., 2.4 GHz) and a second transceiver configured to communicate with devices on a second frequency band (e.g., 433 MHz). Exemplary embodiments of communicating across multiple frequency bands are described in greater detail with respect to FIGS. 13-14.

In some embodiments, secondary communication circuit 226 may include dedicated hardware components configured to communicate with particular components across different frequencies. In some embodiments, secondary communication circuit 226 may be at least partially software-defined, such that the devices with which secondary communication circuit 226 interacts and/or the frequencies upon which secondary communication circuit 226 communicates may be modified using software, without modifying hardware.

In some embodiments, the other devices may include one or more sensors configured to communicate with secondary communication circuit 226 through a communication interface coupled to the sensors (e.g., a radio circuit). For example, a radio circuit may include one or more interfaces to which one or more sensors may be coupled. The radio circuit may be configured to transmit data collected by the sensors to device 106, which may process the data to generate alerts and/or transmit the data to server 114. In some embodiments, the radio circuit may include one or more preconfigured interfaces configured to receive data from particular types of sensors, such as temperature sensors, ambient light sensors, movement sensors, etc. In some embodiments, the radio circuit may be reconfigurable to adapt to different types of sensor input through software and/or simple hardware reconfigurations. For example, in some embodiments, the radio circuit may include a software-defined radio module configured to implement one or more processing functions through the use of processor-readable instructions. Such a radio circuit may include one or more interfaces configurable to receive input from multiple different types of sensors. Adaptability to different sensor input may allow for easy and inexpensive implementation of monitoring for a wide variety of applications related to the transportation of the goods in the vehicle.

Figure 3:
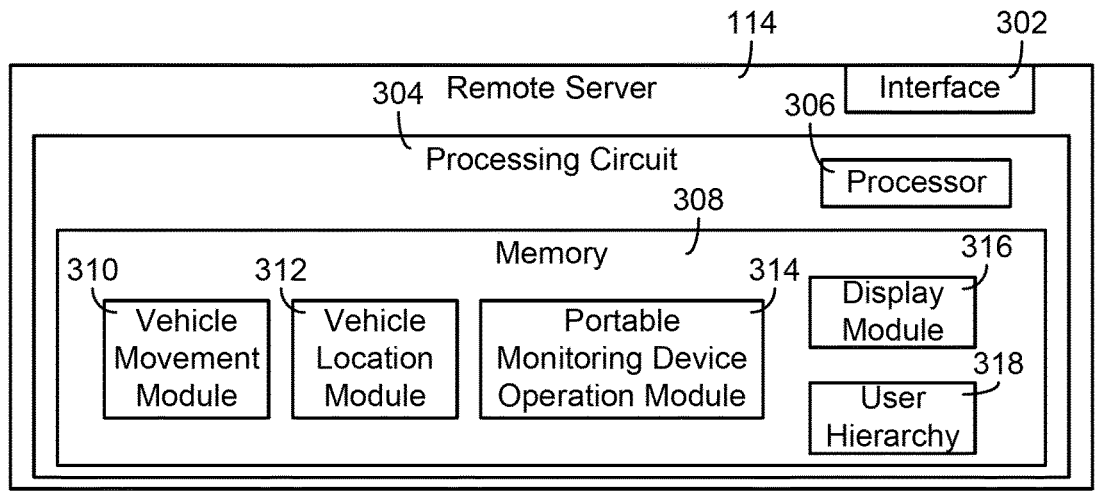
FIG. 3 is a detailed block diagram of the remote server of FIG. 1, according to an exemplary embodiment.

Referring now to FIG. 3, the activities of remote server 114 are shown in greater detail according to exemplary embodiments. Remote server 114 is generally configured to receive signals transmitted by portable monitoring device 106 and to provide support to the activities of portable monitoring device 106, and to provide information to one or more users via a display module 314. Remote server 114 is shown to include an interface 302 configured to wirelessly receive data via network 112. Interface 302 may be any type of wireless interface configured to receive signals from portable monitoring device 106. Remote server 114 includes a processing circuit 304 including a processor 306 and memory 308 as described above.

As described above, some of the activities of location module 218 of portable monitoring device 106 may be executed at remote server 114. For example, memory 308 is shown to include a vehicle movement module 310 configured to determine if transport vehicle 102 has moved from a previous location, based on accelerometer data and cell tower information. Further, memory 308 is shown to include a vehicle location module 312 configured to calculate the current location of transport vehicle 102 or receive the current location from device 106. While in some embodiments the vehicle location and motion is calculated at location module 218 of portable monitoring device 106, in other embodiments some or all of the calculation may occur at vehicle movement module 310 and vehicle location module 312. In such an embodiment, remote server 114 is configured to wirelessly receive input from portable monitoring device 106 via network 112 including signal characteristics (e.g., RSSI) of signals received at device 106 from cell towers 110, accelerometer data, and/or other sensor and/or communication interface (e.g., transceiver) data.

As described above, location module 218 or vehicle movement module 310 may use RSSI data to determine if transport vehicle 102 moved. For example, if the same three cell towers provided the strongest signals to portable monitoring device 106 two times in a row, the RSSI values of the signals may be compared to one another. If the difference in RSSI values exceeded a threshold (e.g., 10%), it may be determined that transport vehicle 102 is moving, as the position of portable monitoring device 106 has changed relative to the cell tower(s). If one or more of the cell towers 110 associated with the set of strongest received signals changes, this may be interpreted as indicating vehicle movement in some embodiments.

In some embodiments, the cell tower signal data and accelerometer data may conflict with each other. For example, if the RSSI values and/or cell tower identification data of the strongest signals indicate that transport vehicle 102 is not moving (based on the signal strength not changing or the cell towers used in the triangulation not changing), but accelerometer data indicates enough vibration, then the location of transport vehicle 102 may be recalculated by portable monitoring device 106 or remote server 114. As another example, if RSSI values indicate that it is likely that transport vehicle 102 has moved, but the accelerometer data indicates no vibration, then it may be determined that transport vehicle 102 has not moved. In other words, in some embodiments, the accelerometer data is primarily used to verify and/or override changes in location determined using the cellular signals in the event that the movement, or lack thereof, indicated by the cellular signals is inconsistent with the movement indicated by the accelerometer data.

Location module 218 and/or vehicle location module 312 may account for a "spidering" effect when calculating the location of transport vehicle 102. Such an effect may occur when the vehicle is stationary or in motion. For example, a different vehicle location may be calculated for the vehicle even though the vehicle is stationary, or a larger movement than what actually occurred may be calculated. Since signals are received at portable monitoring device 106 via cell towers 110, it may be difficult to obtain a precise location of transport vehicle 102 since the signal strength may vary greatly based on various conditions that impact the transmission. For example, various environmental conditions between portable monitoring device 106 and cell towers 110 may impact the signal characteristics detected at portable monitoring device 106. In some circumstances, the cell towers 110 used in triangulation may change despite little or no movement from portable monitoring device 106, such as due to a cell tower 110 being taken offline for maintenance. Therefore, even if the vehicle has not moved for the last two location determination or reporting periods, the vehicle location may be calculated to be in two different locations. Further, if the vehicle has moved, the vehicle movement may be miscalculated due to the variance in signals. Referring also to FIG. 16A, an example spidering effect is shown. The vehicle is shown in two different locations 1604, 1606, at two different times. However, the vehicle may be stationary, and the difference in location between 1604 and 1606, and potentially in other location points shown near locations 1604 and 1606, is caused by the spidering effect.

The spidering effect may be accounted for by portable monitoring device 106 or remote server 114 in various ways. For example, if it is determined that transport vehicle 102 has not moved from a previous location (e.g., based on accelerometer data), but a different location is calculated, then the calculation is either disregarded, or the calculated value is "clamped" (e.g., reducing the magnitude of the value to reduce the change in location). In other words, the impact of the calculation of the new location may either be ignored or reduced. Further, the location may be calculated for multiple reporting periods in which transport vehicle 102 has not moved, and the results are averaged together or otherwise combined to more accurately determine the location of the vehicle.

The location of transport vehicle 102 may be used by remote server 114 to adjust the operation of portable monitoring device 106. For example, the current vehicle location may be used to determine if an alert should be generated and transmitted to portable monitoring device 106 (e.g., if sensor data in combination with the vehicle location indicates a potentially hazardous situation). As another example, the current vehicle location may be used to trigger a transmission to portable monitoring device 106 to enter a power conservation mode (e.g., if the vehicle is close to its destination, then power conservation may not be used; if the vehicle is far away from its destination, then power conservation features may be activated).

Portable monitoring device operation module 314 may provide instructions to portable monitoring device 106. For example, if a warning or alert was generated by portable monitoring device 106, the device may be instructed to transmit sensor data more often. As another example, if a low battery or low power situation is detected on portable monitoring device 106, the device may be instructed to enter a mode in which it transmits signals to remote server 114 less often. Portable monitoring device operation module 314 may be configured to determine a new transmission schedule and to otherwise adjust the operation of portable monitoring device 106.

Display module 316 is configured to generate data for display to one or more users (e.g., a carrier, a recipient, a shipper, etc.) relating to transport vehicle 102 location and status. For example, display module 316 may generate maps, tables, or other visual data (e.g., as shown in FIGS. 16A-D) that illustrate the location of the vehicle or the temperature and other characteristics of the cargo. The display may indicate the position of the vehicle at different times, if and where the vehicle has stopped moving, and other general trip properties (e.g., trip duration, distance covered and distance left, etc.). Display module 316 may further generate data relating to one or more alarms or warnings generated by portable monitoring device 106 or remote server 114 (e.g., temperature too high or low, ambient light level too high, etc.). Display module 316 may further generate data relating to a power supply status of portable monitoring device 106 (e.g., if the power supply is low enough such that updates from portable monitoring device 106 will become less frequent in the future). Display module 316 may update at regular intervals (e.g., every 15 minutes, every time remote server 114 receives a signal from portable monitoring device 106) or may update as warranted (e.g., when transport vehicle 102 has arrived at a destination, upon generation of an alert or warning, etc.). It should be understood that display module 316 may generate any type of report (e.g., images, text, email, etc.) for any type of device (e.g., laptop, desktop, mobile device, tablet, etc.), and may generate the report for different users (e.g., a first responder, a supervisor) depending on the nature of the report. The data generated by display module 316 may be provided to one or more user devices, for example, via a network (e.g., using an app, a web-based interface, etc.).

Remote server 114 is shown to include a user hierarchy 318, in some embodiments. In one embodiment, remote server 114 stores a user hierarchy, and may receive updates to the hierarchy from another source. In another embodiment, remote server 114 may be configured to both store and maintain or update the user hierarchy. While user hierarchy 318 is shown in remote server 114, in other embodiments, user hierarchy may alternatively or additionally be stored in portable monitoring device 106.

User hierarchy 318 may indicate a plurality of users responsible for supervising or managing the transport of goods 104 via transport vehicle 102. For example, user hierarchy 318 may include one or more users assigned to monitor the vehicle, and one or more supervisors assigned to receive alerts or warnings related to vehicle operation. Different users in the user hierarchy may have different levels of responsibility related to operation of the transport vehicle and the goods. In some embodiments, user hierarchy 318 may be a list detailing the responsibilities and may indicate to remote server 114 a list of users for which display data, alerts, etc. should be generated.

In one embodiment, remote server 114 may generate a report for a first user (or users) during normal operation of the transport vehicle. If an alert or warning is generated by portable monitoring device 106, remote server 114 may generate a display indicating the alert to the first user. Remote server 114 may then receive confirmation of receipt of the alert by the first user, or confirmation that the first user has addressed the alert. Remote server 114 may, if it does not receive a confirmation, generate an alert for a second user (e.g., a supervisor of the first user, a backup user, etc.). User hierarchy 318 may be used by remote server 114 to determine which users should be given which alerts. For example, one type of alert (e.g., ambient light increase) may be given to a first user while another type of alert (e.g., temperature increase) may be more appropriate for a second user.

Referring generally to FIGS. 2-3, it should be understood that the various activities of portable monitoring device 106 may be executed by remote server 114, and vice versa. Portable monitoring device 106 and remote 114 may or may not coordinate with one another to generally implement the processes described herein.

Figure 4:
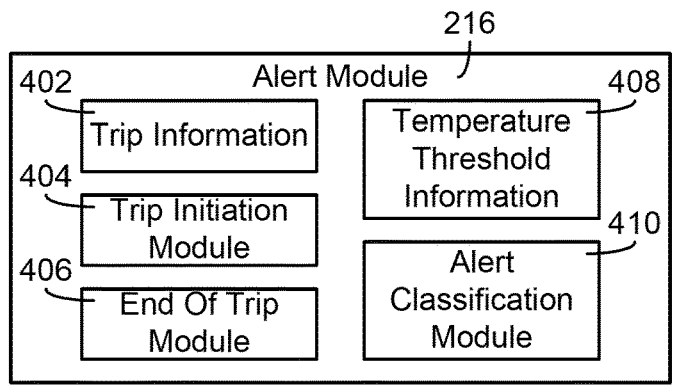
FIG. 4 is detailed block diagram of the alert module shown in FIG. 2, according to an exemplary embodiment.

Referring generally to FIGS. 4-8, temperature monitoring and alerting activities of portable monitoring device 106 are described in greater detail, according to exemplary embodiments. Referring to FIG. 4, the activities of alert module 216 are shown in greater detail, according to an exemplary embodiment. Alert module 216 may generate alerts based on various sensor data and location data received at portable monitoring device 106. For example, alert module 216 is shown to include trip information 402. Trip information 402 may include a planned route and destination of transport vehicle 102 and location data relating to the route. If transport vehicle 102 has arrived or is in the same geographic area of the destination (based on location data from location module 218), alert module 216 may suppress some or all possible alerts. For example, if a temperature is rising in transport vehicle 102, but the vehicle has reached its destination, an alert may be suppressed since the temperature increase may not impact the goods since the goods have arrived (or are currently being unloaded from the vehicle).

In some embodiments, alert module 216 includes an end of trip module 406 to determine if transport vehicle 102 has reached its destination, based on trip information 402, location information, and other information. In some embodiments, alert module 216 may generate an alert to send to remote server 114 that indicates that the goods have arrived at their destination. Alert module 216 may further send the information to power management module 212, which may then be configured to power down the various sensors of portable monitoring device 106 (e.g., when monitoring of the goods is no longer needed). For example, various sensors may be disabled, and/or sensor data from after the determination may be excluded from a set of temperature measurements for the goods. In some embodiments, a SIM card coupled to transmit/receive circuit 202 of portable monitoring device 106 (e.g., the cellular transceiver) may be deactivated upon receiving the indication that transport vehicle has arrived at the destination.

End of trip module 406 may further use other sensor data to determine the end of the trip. For example, end of trip module 406 may utilize temperature data from temperature sensor 220. If the temperature suddenly increased by a significant amount (e.g., frozen food removed from the transport vehicle), end of trip module 406 may check to see if the vehicle is at or near its destination. If so, it may be determined that the temperature increase is the result of the goods reaching their destination (e.g., the result of the a cargo area door being opened to unload the goods) and not an error of the cooling system of the transport vehicle or other problem. As another example, ambient light data from ambient light sensor 222 may be used. If the ambient light suddenly increases by a significant amount (e.g., goods being removed from the vehicle into the sunlight), it may be determined whether the location of device 106 is at the destination or another known checkpoint. If so, it may be determined that the goods are being unloaded at their destination. If not, an alert may be raised, as an unexpected opening of a cargo area could indicate tampering with or theft of the goods. As another example, accelerometer data from accelerometer 224 may be used. If the accelerometer no longer reports vibration (indicating the vehicle has stopped moving), it may be determined that the goods have arrived at their destination, instead of determining there is an issue with the transport vehicle or that the transport vehicle is idling near a dock waiting for a dock slot to open. As yet another example, transmit/receive circuit 202, secondary circuit 226, and/or another circuit (e.g., communication circuit, such as a radio frequency communication device) may be configured to communicate with beacons or other signal transmission devices located at or near a destination (e.g., mounted on or near a loading dock). Portable monitoring device 106 and/or remote server 114 may determine the cargo has reached the destination in response to receipt of a signal from the beacon, alone or in combination with determining that the location of portable monitoring device 106 is near the destination location. Any combination of location data, trip information, temperature data, ambient light data, accelerometer data, and/or other sensor data may be used to determine an end of trip scenario.

In some embodiments, end of trip module 406 may, upon reaching the destination, automatically generate an alert and/or report to send to remote server 114 indicating the trip has concluded. In response to the alert, portable monitoring device 106 and/or remote server 114 may generate a summary report providing information relating to the trip, such as a summary of one or more locations over the course of the trip, or one or more conditions relating to the goods (e.g., temperature conditions). For example, in some embodiments, portable monitoring device 106 and/or remote server 114 may generate a report indicating information about the temperature of the goods over the trip, such as average temperature, variance in temperature (e.g., high temperature, low temperature, etc.), a log of the recorded temperatures, graphs illustrating the temperature over the trip, and/or other types of temperature-related information. In some embodiments, additional information may be provided, such as areas where the vehicle stopped for at least a threshold amount of time, instances where a cargo door was opened (e.g., based on light sensor 222), and/or other information. In some embodiments, the summary report may be provided to a user, such as the shipper, receiver, and/or carrier. In some embodiments, the report may be configured to fulfill one or more reporting requirements, such as FDA or other governmental/regulatory reporting requirements.

In some embodiments, alert module 216 includes a trip initiation module 404 configured to determine when transport vehicle 102 has started a trip (or has started a certain portion or segment of the trip). Trip initiation module 404 may receive an indication that the transport vehicle is currently stopped, and may check location data and sensor data to determine when the vehicle begins moving. For example, when the vehicle begins moving, accelerometer 224 may detect the vibrations, which may be used by trip initiation module 404 to determine that the trip has started (e.g., if the location is at or near a known starting location). In some embodiments, other sensors may be used alone or in combination with accelerometer 224, such as light sensor 222 (e.g., detecting when a door has been closed prior to moving, suggesting cargo has just been loaded/inspected) and/or temperature sensor 220 (e.g., detecting a higher temperature that has begun to drop, which may indicate the cargo is loaded and the door has been closed, allowing refrigeration to begin). Trip initiation module 404 may be used by alert module 216 to determine when to begin checking for alerts (e.g., ignoring false alerts generated by sensor data before beginning the trip).

An alert may be generated by alert module 216 based on, for example, temperature levels. If the temperature level exceeds a threshold, an alert is generated. Alert module 216 is shown to include temperature threshold information 408. For example, temperature threshold information 408 may include one or more high temperature and low temperature thresholds for one or more goods. In one embodiment, a first high (or low) temperature threshold may be a temperature that poses a general or moderate risk to the goods, while a second high (or low) may be a temperature that poses a more immediate risk to the goods. In other words, temperature threshold information 408 may include multiple threshold values that indicate different levels of risk to the goods.

In some embodiments, the duration or cumulative time goods spend above a threshold may be monitored. For example, if a temperature is above a certain threshold for a long period of time, it may be more harmful to the goods than if the goods were exposed to an even higher temperature for a shorter period of time. Temperature threshold information 408 may include information regarding how long the goods are allowed to be kept at a given temperature before an alert is to be generated. For example, if the temperature exceeds a threshold, an alert may not immediately be generated. In some embodiments, the alert may be generated only if the temperature stays above the threshold for a particular amount of time. In some embodiments, the cumulative time spent above a threshold may be a total amount of time over a particular timeframe, such as the duration of the trip. If the total amount of time above the threshold level exceeds a particular amount of time, an alert may be generated, regardless of whether or how many times the temperature dropped below the threshold. In some embodiments, the cumulative amount of time above the threshold may be compared to the cumulative amount below the threshold in determining whether to generate an alert.

Figure 5:
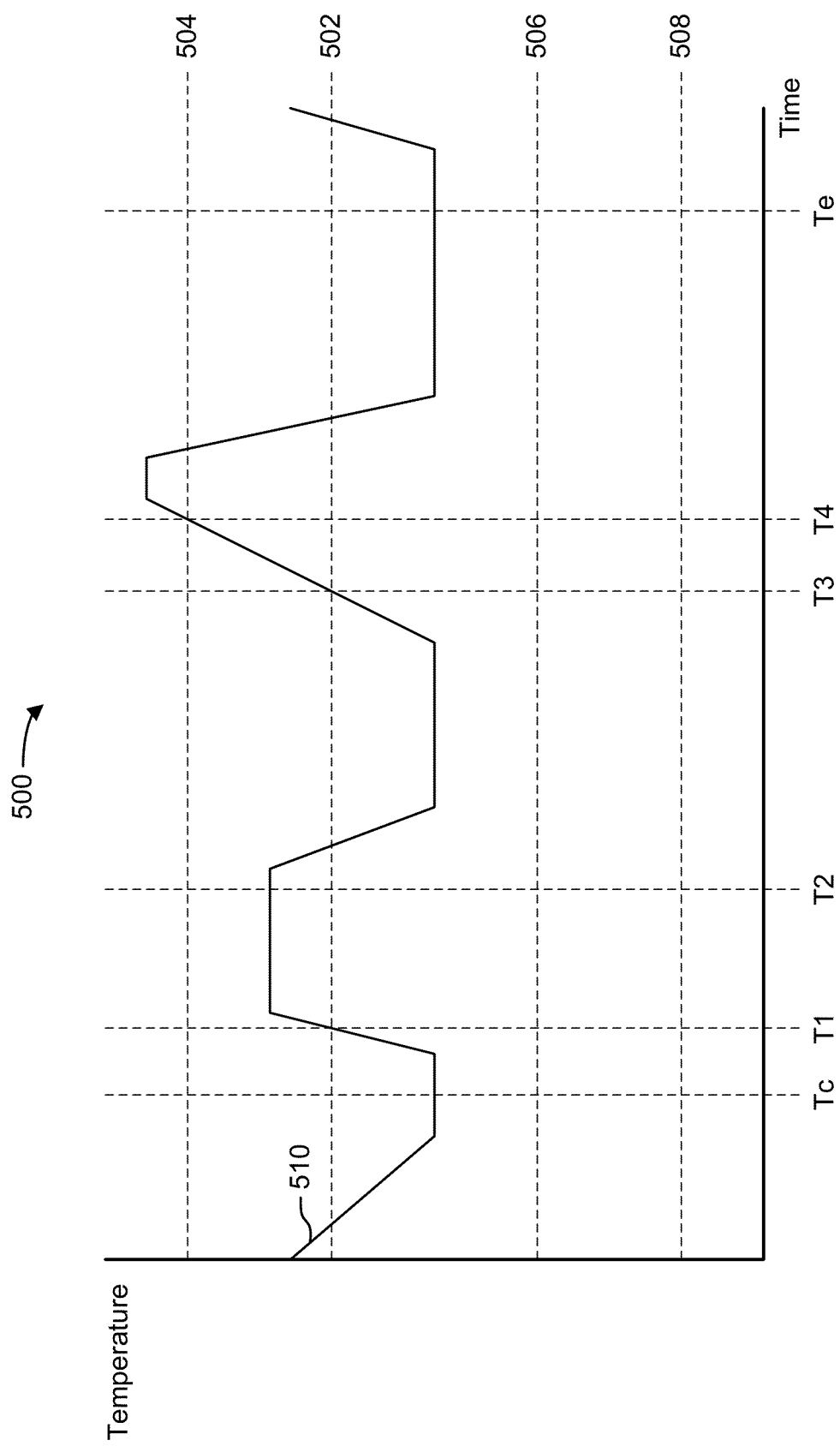
FIG. 5 is a graph illustrating various temperature levels and a method of generating alerts for high or low temperature levels, according to an exemplary embodiment.

Referring also to FIG. 5, a graph 500 illustrating the use of temperature threshold information 408 is shown, according to an exemplary embodiment. Graph 500 illustrates a first high temperature threshold 502 and a second high temperature threshold 504. In one embodiment, when the temperature reaches threshold 502, a general, low urgency alert may be generated by alert module 216. When the temperature reaches threshold 504, a higher urgency alert may be generated by alert module 216. A first low temperature threshold 506 and second low temperature threshold 508 are also illustrated, for which a low urgency alert or high urgency alert may be generated. While the systems and methods herein are described for high temperature scenarios, it should be understood that the systems and methods may be similarly applied for low temperature scenarios. Further, while only two high thresholds 502, 504 are illustrated in graph 500, it should be understood that there may be any number of threshold values utilized by alert module 216. In some embodiments, the thresholds may be set by remote server 114. In other embodiments, the thresholds at which alerts are generated may be specified by a user, generated based on characteristics of the goods (e.g., based on a known desired or safe temperature range of the goods), or otherwise.

The temperature inside a transport vehicle for the duration of an example trip is illustrated by line 510. At time T1, the temperature increases above threshold 502. In one embodiment, alert module 216 may generate a high temperature alert to transmit to remote server 114. In another embodiment, alert module 216 may only generate the high temperature alert if the temperature stays above threshold 502 for a given period of time. For example, the temperature is shown staying above threshold 502 until time T2, and an alert may only be generated upon reaching time T2. The time T2 may be a time calculated by portable monitoring device 106, remote server 114, or predefined by a user. The temperature is shown dropping after the temperature rise, which may be in reaction to an action taken in response to the alert, such as a change in operating parameters (e.g., of the refrigeration system) through a command sent from remote server 114 or intervention by a human, such as an occupant of transport vehicle 102. If the temperature drops below the threshold before time T2, then no alert may be generated, in some embodiments.

At time T3, the temperature is shown increasing above threshold 502. The temperature may continue to rise, above the second threshold 504 at time T4. Upon reaching threshold 504, an alert may automatically be generated by alert module 216 regardless of how much time has elapsed, in some embodiments.

In various embodiments, any number of thresholds may be defined by temperature threshold information 408, and any characteristic of the temperature may be used to determine when to send alerts. For example, if the temperature is rising or dropping too quickly, an alert may be generated regardless of the time the temperature has spent above a threshold. As another example, if the temperature is decreasing and an alert has not yet been generated because not enough time has elapsed, alert module 216 may not generate an alert, no matter how long the temperature is above the threshold. Temperature threshold information 408 may include any number of thresholds, each threshold associated with a specific time limit (e.g., amount of time spent above the threshold before an alert is generated), in some embodiments.

As illustrated in FIG. 5, a cool down time Tc and end of trip time Te is defined. Time Tc may define the time before beginning the trip. If the goods have just been loaded onto the transport vehicle, it may take time for the goods to reach a desired temperature level, and therefore temperature readings may be disregarded before time Tc. Similarly, if the goods have reached their destination at time Te, then any temperature readings may be disregarded, even if the temperature exceeds a threshold.

Referring again to FIG. 4, an alert classification module 410 may use temperature threshold information 408 to determine an alert level. For example, as described above, an alert may be more urgent for threshold 504 compared to threshold 502, or an alert may be more urgent based on the amount of time spent above a threshold. In some embodiments, alerts may be generated based on both an amount of time above a threshold and a temperature amount (e.g., absolute or an amount above a threshold). For example, an alert may be generated if the temperature if two degrees above threshold 502 for five hours, or if the temperature is seven degrees above threshold 502 for 45 minutes, in one embodiment.

Alert classification module 410 may determine an alert level such that remote server 114 may notify users appropriately. For example, a low alert level may mean that remote server 114 only notifies a single user responsible for basic monitoring of the transport vehicle and goods. A high alert level may mean that remote server 114 notifies a supervisor, or multiple users. While alert classification module 410 is shown as part of alert module 216, some or all of its activities may occur in remote server 114 (e.g., remote server 114 receives or retrieves temperature threshold information 408 and makes its own determinations).

Figure 6:
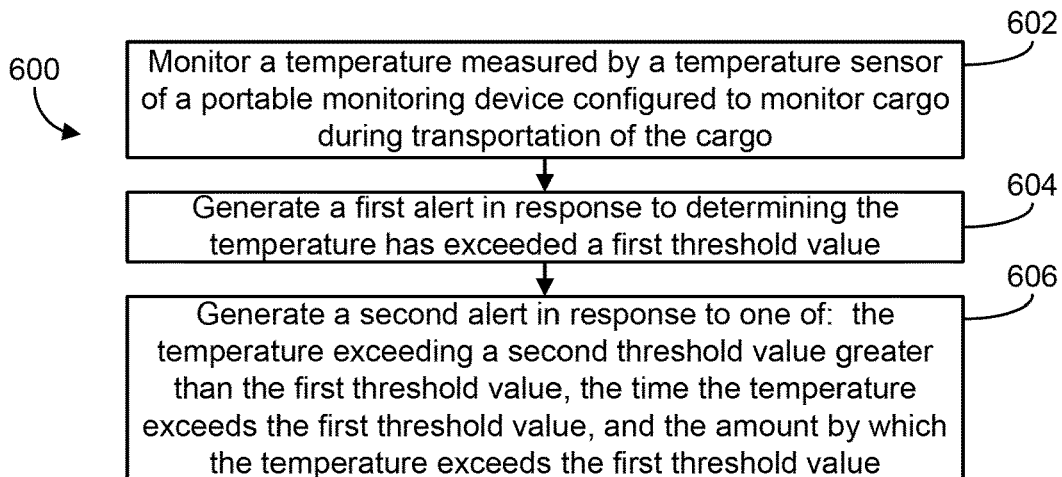
FIG. 6 is a flow chart of a process for monitoring temperature in a transport vehicle using a portable monitoring device, according to an exemplary embodiment.

Referring now to FIG. 6, a flow chart of a process 600 for monitoring temperature in a transport vehicle using a portable monitoring device is shown. Process 600 may be executed by, for example, alert module 216. Process 600 includes monitoring a temperature measured by a temperature sensor of a portable monitoring device configured to monitor cargo during transportation of the cargo (602). Process 600 further includes generating a first alert in response to determining the temperature has exceeded a first threshold value (604). For example, if the temperature increases or decreases past a threshold value, an alert is generated for a remote server that identifies the condition.

Process 600 further includes generating a second alert (606). The second alert may be generated in one of many example conditions. For example, in some embodiments, if the temperature exceeds a second threshold value greater than the first threshold value, the second alert is generated since the temperature has now increased or decreased past two different threshold values. As another example, if a time that the temperature exceeds the first threshold value exceeds a threshold, the second alert is generated since the temperature has been above or below the threshold for too long. As another example, if an amount by which the temperature exceeds the first threshold exceeds a particular value, the second alert is generated since the temperature, after reaching the first threshold value, has continued to increase or decrease. In some embodiments, the first alert is generated as a warning, while the second alert indicates a critical situation has been reached in the transport vehicle that may pose a risk to the safety of the goods.

In some embodiments, at block 606, a combination of the various scenarios may be used to determine when to send the second alert. For example, a combination of an increase or decrease in temperature past a threshold value and the time spent above or below the threshold may be used in the determination. In other words, alert module 216 may be configured to combine several factors to determine when a critical situation is present in the transport vehicle.

Figure 7:
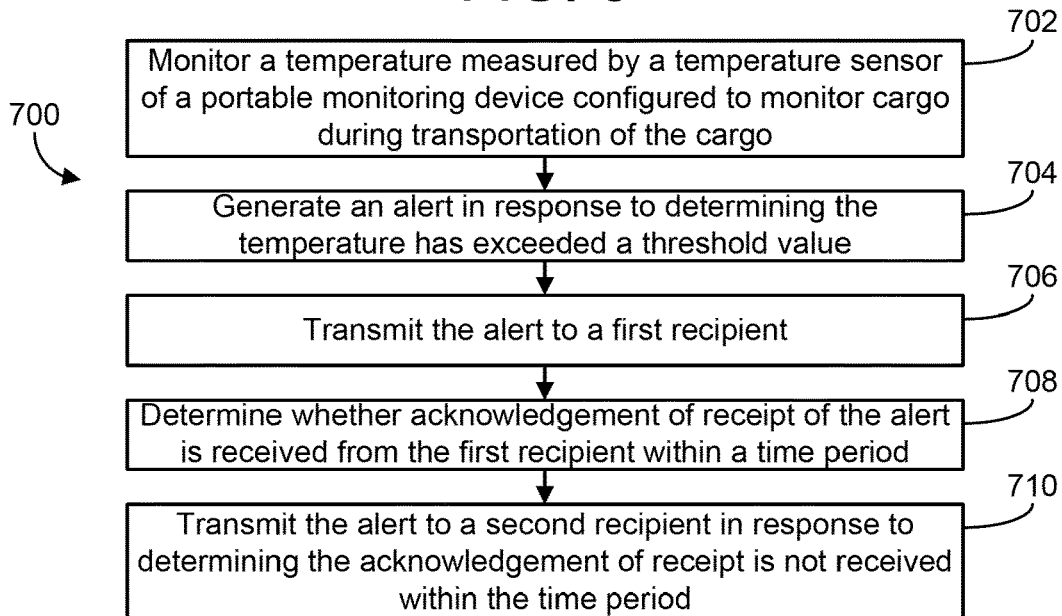
FIG. 7 is a flow chart of a process for multiple-level alerting using a portable monitoring device, according to an exemplary embodiment.

Referring now to FIG. 7, a flow chart of a process 700 for multiple-level alerting using a portable monitoring device is shown. Process 700 may be executed by, for example, alert module 216 and remote server 114. Process 700 includes monitoring a temperature measured by a temperature sensor of a portable monitoring device configured to monitor cargo during transportation of the cargo (702). Process 700 further includes generating an alert in response to determining the temperature has exceeded a threshold value (704).

Process 700 further includes transmitting the alert to a first recipient (706). For example, the alert is transmitted to a user assigned to monitor the goods and transport vehicle. The first recipient may be chosen based on the user hierarchy stored by the portable monitoring device or remote server, in some embodiments. The user hierarchy may be a list of users which may be provided the alert, and one or more users may be chosen from the list based on the type and urgency of the alert.

Process 700 further includes determining whether an acknowledgement of receipt of the alert is received from the first recipient within a time period (708). For example, block 708 may include receiving confirmation from the first recipient, or confirmation that the first recipient is addressing the alert. The time period may be a set period of time (e.g., two hours), or may be flexible or adjustable based on the type of alert and current status of the goods and transport vehicle. For example, the time period may be adjusted based on an amount the temperature exceeds a threshold (e.g., the greater the amount, the shorter the time period). As another example, the time period may be adjusted based on an amount of time the temperature has exceeded the threshold (e.g., the longer the time, the shorter the time period). As yet another example, the time period is shortened for a critical alert compared to a general warning.

Process 700 further includes transmitting the alert to a second recipient in response to determining the acknowledgement of receipt is not received within the time period (710). For example, the second recipient may be the supervisor of the first recipient. In some embodiments, the alert may continue to be transmitted/escalated to other users (e.g., until an acknowledgement is received and/or some action is taken in response to the alert, or until the condition causing the alert to be generated subsides). In some embodiments, a user (e.g., carrier/shipper/receiver) may be provided an interface through which the user can provide a list of users to whom alerts should be provided, how often the alerts should be provided, etc.

Figure 8:
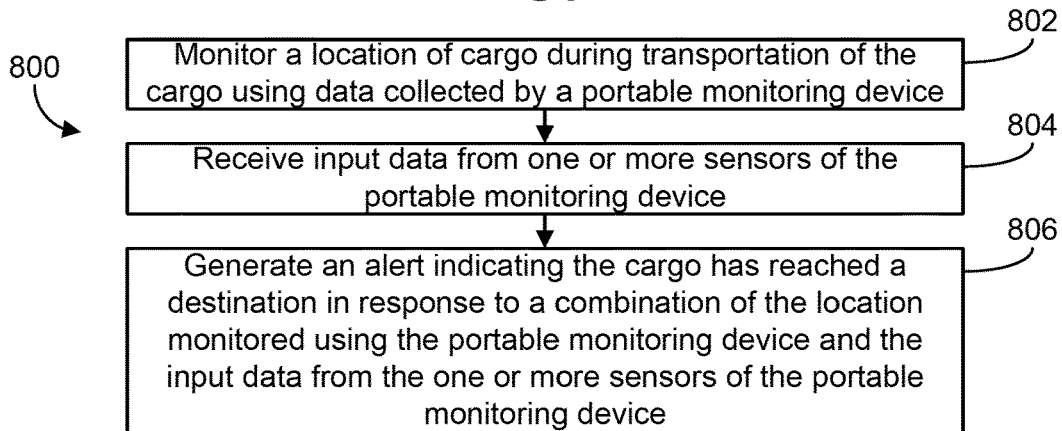
FIG. 8 is a flow chart of a process for detecting an end of trip of a transport vehicle, according to an exemplary embodiment.

Referring now to FIG. 8, a flow chart of a process 800 for detecting an end of trip of a transport vehicle is shown. Process 800 may be executed by, for example, alert module 216. Process 800 includes monitoring a location of cargo during transportation of the cargo using data collected by a portable monitoring device (802). Block 802 may include receiving signals from one or more cell towers and using cellular triangulation to estimate the location of the portable monitoring device, for example.

Process 800 further includes receiving input data from one or more sensors of the portable monitoring device (804). The input data relates to one or more characteristics pertaining to the cargo. Process 800 further includes generating an alert indicating the cargo has reached a destination in response to a combination of the location monitored using the portable monitoring device and the input data from the one or more sensors of the portable monitoring device (806). Process 800 may optionally include deactivating various components of the portable monitoring device, such as the SIM card and sensors. Sensor reporting may be suppressed at block 806.

In some embodiments, the sensors include a light sensor. If the light sensor measures an increased intensity of ambient light, it may be determined that the cargo has reached its destination. If the transport vehicle is at or near the geographic location of the destination, and since the ambient light increased, the cargo may be moved out of the transport vehicle, or at least the transport vehicle doors have been opened.

In some embodiments, the sensors include a temperature sensor. If an increase in temperature is measured, it may be determined that the cargo has reached its destination. If the transport vehicle is at or near the geographic location of the destination, and since the temperature increased, the cargo may be moved out of the transport vehicle.

In some embodiments, the sensors include an accelerometer. If the accelerometer data indicates the vehicle is stationary (no vibration), it may be determined that the cargo has reached its destination. If the transport vehicle is at or near the geographic location of the destination, and if the vehicle has stopped, the cargo may have arrived at its destination. Any combination of the location, light sensor data, temperature sensor data, accelerometer data, and/or other sensor data may be used in process 800.

In some embodiments, the sensors include circuitry, such as transmit/receive circuitry or other types of communication circuitry (e.g., utilizing WiFi, Bluetooth, cellular, RFID, and/or other wired or wireless communication methods, such as radio frequency communication methods) configured to communicate with devices at or near a destination. For example, a beacon or other communication device may be mounted on or near a loading dock at a destination and configured to transmit a signal to the portable monitoring device indicating to the portable monitoring device that it is near the dock. In another example, a device carried by a user at the dock may transmit the signal. In some embodiments, the signal may include an identifier of the device, the location, an owner of the location, or other characteristics. In some embodiments, the portable monitoring device and/or remote server may determine the trip has concluded using the signal. In some such embodiments, the determination may be made using only the signal, and not in combination with data indicating the location of the portable monitoring device. In some such embodiments, the end of trip determination may be made in response to receiving the signal from the device at or near the destination and confirming that the location of the portable monitoring device is at or near the destination location.

In some embodiments, similar location and sensor information may be used to sense conditions other than an end of the trip. For example, in some embodiments, sensors and location information may sense a beginning of the trip. For example, location data may be at or near a geographic area from which the goods are picked up, and light data, movement data, and/or temperature data may be used to confirm when the goods are entered into the transport vehicle, a cargo door of the transport vehicle is shut, and the vehicle is moving. In some embodiments, sensors and location information may be used to detect when a vehicle reaches one or more checkpoints, such as points at which cargo is inspected. For example, if the location data is at or near a geographic area associated with a checkpoint, light sensor data indicates an increase followed by a decrease in light, and temperature data indicates a temporary increase in temperature, this may indicate the cargo door was opened at the checkpoint, the cargo was inspected, and the door was shut. If similar circumstances happen at a location away from a known checkpoint area, in some embodiments, an alert may be generated to inspect the cargo for tampering or theft due to an unauthorized access of the cargo area.

In some embodiments, the portable monitoring device and/or remote server may additionally or alternatively monitor a location of the portable monitoring device and determine whether the cargo is likely to reach the destination within a delivery timeframe. For example, the portable monitoring device and/or remote server may be provided with delivery schedule data indicating a date and/or time by which the cargo is scheduled to be delivered. The portable monitoring device and/or remote server may determine a location of the destination and a current location of the portable monitoring device and calculate a distance to reach the destination.

The portable monitoring device and/or remote server may determine a time to reach the destination using the calculated distance. The time to reach the destination may be determined using one or more of a variety of factors. For example, in some embodiments, the time to reach the destination may be calculated based on an average speed of the vehicle over one or more historical trips (e.g., trips having similar characteristics, such as a same or similar route, as the current trip). In some embodiments, the time to reach the destination may be determined in part using an estimate of a distance a vehicle can travel within a particular timeframe. In some embodiments, the time to reach the destination may be determined in part using speed limit data for one or more roads over which the vehicle is expected to travel. In some embodiments, the time to reach the destination may be determined using data from one or more other platforms or computing devices. For example, a logging platform may provide an estimate of a distance before the driver is scheduled or mandated to stop for a break (e.g., based on a maximum amount of consecutive time during which the driver is permitted to drive). In some embodiments, various of the factors noted above and/or other factors may be used in combination to determine an amount of time to reach the destination.

The portable monitoring device and/or remote server may compare the amount of time to reach the destination to a remaining amount of time left until the deadline to deliver the cargo arrives. If the comparison indicates the cargo will not be delivered on time (e.g., if the time to reach the destination exceeds the remaining amount of time before the deadline), the portable monitoring device and/or remote server may generate and transmit one or more alerts to a user of the system. For example, in some embodiments, the portable monitoring device and/or remote server may transmit an alert to a user via a computing device of the user. In some such embodiments, the alert may be provided to the user through a website or other portable through which the user can monitor information about the status of a shipment. In some such embodiments, the alert may be provided to the user on a device of the user, such as via an app installed on a smartphone or other portable device of the user. In some such embodiments, the alert may be provided via a notification to the user through a text message (e.g., SMS, MMS, etc.), email, or other communication medium.

In some embodiments, multiple levels of alerts may be provided based on an amount of time by which the shipment is expected to miss the scheduled delivery time. For example, if the shipment is expected to miss the delivery time by less than a threshold amount of time, the alert may be provided by one medium (e.g., via a web portal) and/or to one user (e.g., an individual with primary responsibility to monitor the shipment). If the shipment is expected to miss the delivery time by more than the threshold time, the alert may be provided by multiple media (e.g., via the web portal and an email/text notification) and/or to multiple users (e.g., to the individual with primary responsibility to monitor the shipment and to a manager of that individual). In various embodiments, various conditions (e.g., multiple levels of thresholds) and/or resultant actions (e.g., delivery methods and/or individuals to receive alerts) may be defined. In some such embodiments, the conditions and/or resultant actions may be defined by a user of the system or may be predefined by the system (e.g., default conditions).

Figure 9:
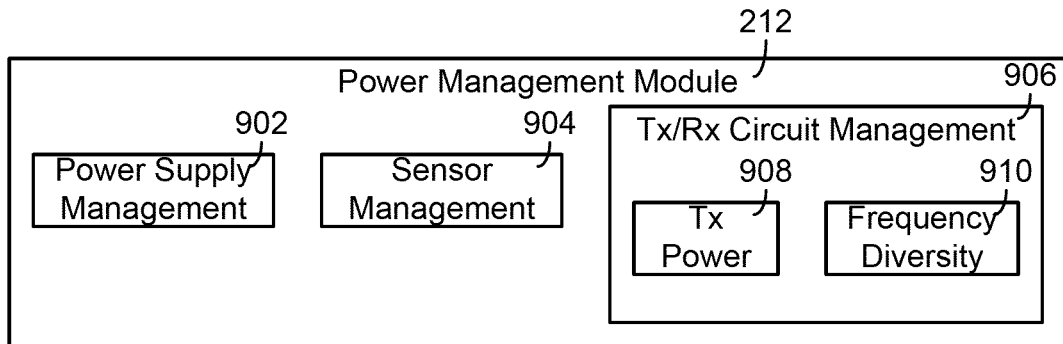
FIG. 9 is a detailed block diagram of the power management module shown in FIG. 2, according to an exemplary embodiment.

Referring generally to FIGS. 9-14, power management activities of portable monitoring device 106 are described in greater detail, according to exemplary embodiments. Referring now to FIG. 9, the activities of power management module 212 of FIG. 2 are shown in greater detail, according to an exemplary embodiment. While power management module 212 is shown to be a part of portable monitoring device 106, it should be understood that various functions and features described herein could be performed by remote server 114, portable monitoring device 106, or a combination thereof. For example, power management and/or communication processing may be performed by remote server 114, which may transmit commands to portable monitoring device 106, causing portable monitoring device 106 to change various operating parameters, such as a transmission or measurement schedule, transmission power, transmission frequency, etc.

Power supply management module 902 is configured to determine a charge condition (e.g., an amount of remaining charge) for portable monitoring device 106. Power supply management module 902 may determine a power output required for proper operation of portable monitoring device 106 (e.g., to conserve enough battery life to keep the device operating over the course of a trip). For example, power supply management module 902 may determine the amount of power used for a periodic transmission of sensor data and location data to remote server 114. Power supply management module 902 may further determine the amount of power used for normal operation of the various sensors (e.g., sensors 220-224) of the device. Using the amount of power expected to be used by portable monitoring device 106, and the current charge condition of power supply 204, power supply management module 902 may determine if the device has enough power, or if adjustments to the operation of the device are warranted to conserve power. For example, power supply management module 902 may specify a desired operating mode of one or more sensors or a desired frequency channel to use for transmissions between portable monitoring device 106 and one or more other devices (e.g., sensor devices, other portable monitoring devices, remote server 114, etc.).

In some embodiments, power supply management module 902 may estimate the amount of power used for operation of portable monitoring device 106 based on a travel schedule of the goods and the current location of the transport vehicle. For example, assume that a travel plan for the goods includes transportation of the goods by a combination of a truck and a boat (i.e., the goods are being shipped across a river or ocean for at least a portion of the trip). In such a situation, it may not be desirable or possible for portable monitoring device 106 to transmit data to remote server 114 as often. Power supply management module 902 may receive an indication from location module 218 (or remote server 114, or another module) that the goods are currently in a location on or near a boat (e.g., at a harbor, on a dock, at a port, etc.). Upon receiving the indication, power supply management module 902 may increase the time between transmissions of the device to remote server 114 or temporarily discontinue the transmissions (e.g., to conserve power over a long boat trip and/or because portable monitoring device 106 may be incapable of transmitting messages in absence of cell towers 110). In various embodiments, power supply management module 902 may adjust the power usage of the device regardless of the current power supply of the device, or may only make the adjustment upon determining that the power supply is running low.

As another example, assume that a travel plan for the goods includes transportation of the goods via aircraft. In some embodiments, power supply management module 902 may implement one or more rules in determining transmissions to remote server 114. For example, upon receiving an indication that the goods are loaded on the aircraft (e.g., based on a location of portable monitoring device 106 being within a geographic area associated with an airport or portion of an airport), power supply management module 902 may cause portable monitoring device 106 to not send a transmission to remote server 114 while the goods are still on the aircraft (e.g., if air regulations prohibit in-flight cellular transmissions, to avoid attempting transmissions and wasting power when not in proximity to cell towers 110, etc.). Power supply management module 902 may make any other such adjustments based on the travel itinerary or based on any rules or regulations associated with the wireless transmissions.

A sensor management module 904 is configured to manage sensor activity in portable monitoring device 106. In some embodiments, one or more sensors may provide sensor data for portable monitoring device 106 on a scheduled interval (e.g., every five minutes, every hour, at specific times of day based on a pre-known schedule, etc.). In some embodiments, one or more sensors may provide sensor data when a significant event happens in the environment (e.g., the opening of a truck door causing a sudden increase in ambient light).

In some embodiments, power supply management module 902 may determine there is not enough power to support operation of all the sensors in portable monitoring device 106 throughout an entire trip, and/or that sensor measurements for one or more of the sensors could be made less frequently and still provide sufficient monitoring performance for a particular application. Sensor management module 904 may adjust sensor operation in response to such a determination. For example, the schedule on which data is collected by the sensors (e.g., an interval or period between measurements) may be adjusted. Instead of taking a temperature reading with the temperature sensor every five minutes, for example, the interval may be adjusted to once every fifteen minutes, once every hour, or the sensor may only take readings upon user or remote server 114 request. As another example, sensor and/or location data may be transmitted to remote server 114 on a different schedule (e.g., transmitting sensor and/or location data less often).

In some embodiments, location information may be used to adjust the measurement periods or reporting periods of the sensors. For example, if transport vehicle 102 has entered a predetermined geographic area, sensor readings may be more or less important based on the surrounding environment. If the goods are being transported on an aircraft, then the transmission of sensor data from portable monitoring device 106 may be suspended or performed less often. In some embodiments, reporting and/or measurements may be resumed upon detecting device 106 has reached a destination airport (e.g., based on location data, altitude data from an altimeter or other device, movement data from accelerometer 224, ambient light data from light sensor 222, etc.).

In some embodiments, sensor data itself may be used to adjust the operation and/or measurement/reporting schedule of the sensors in device 106. For example, if ambient light sensor 222 detects a sudden increase in intensity of light, then the doors of transport vehicle 102 may be open, and in response, the frequency of one or more sensor readings may either be increased to account for the potentially hazardous situation or decreased or suspended to avoid misreporting conditions based on the open door (e.g., avoid including temperatures after an end of trip as part of an average temperature during the trip). As another example, if a sudden increase or decrease in temperature occurs, the frequency of all sensor readings may be increased.

A transmitter/receiver circuit management module 906 is configured to manage transmissions by portable monitoring device 106. Portable monitoring device 106 may transmit signals to remote server 114 on a regular (e.g., periodic) or irregular (e.g., in response to the occurrence of one or more events) schedule. In some embodiments, signals may be transmitted to remote server 114 every fifteen minutes, every hour, etc. In some embodiments, the transmission schedule may be adjusted based on the type of transportation involved (e.g., transmitting once every four hours on a boat and once every hour on a truck), based on the location of the vehicle (e.g., transmitting more often when the vehicle is close to its destination), or otherwise. In some embodiments, the transmission schedule is adjusted based on the power supply remaining in device 106.

In some embodiments, the transmission power of transmissions from portable monitoring device 106 to one or more other devices (e.g., another portable monitoring device, sensors monitoring other cargo portions, remote server 114 via cell towers 110, etc.) is adjusted using a transmission power management module 908. For example, if it is determined that the power supply remaining cannot support regularly scheduled transmissions of portable monitoring device 106 to one or more other devices, then the transmission power of subsequent transmissions may be lowered gradually over time, until the transmission power reaches a level at which portable monitoring device 106 can complete all scheduled transmissions until the end of the trip or the transmission power cannot be reduced without compromising the quality of the connection between device 106 and the other devices. In some embodiments, portable monitoring device 106 may begin transmitting using more transmission power to establish a good connection, and may reduce the power gradually over multiple transmissions to find a transmission power level that is appropriate for device 106 while conversing some power.

In some embodiments, a signal strength of a signal received at the other device with which portable monitoring device 106 is communicating (e.g., a sensor connected via a secondary radio connection, another portable monitoring device, etc.) is determined. In some embodiments, the other device may be within a same enclosure as portable monitoring device 106, or may be carried on or coupled to a same vehicle as portable monitoring device 106. In some embodiments, the other device may be on another vehicle within a fleet of two or more vehicles carrying cargo in proximity to one another. In some embodiments, the other device may be remote server 114, and remote server 114 may receive data relating to a signal strength of signals received by cell towers 110 from portable monitoring device 106 for use in modifying a transmission power of portable monitoring device 106.

If the signal strength is greater than a threshold signal strength (e.g., a minimum acceptable signal strength to maintain a good connection between devices), then the power level of subsequent transmissions may be reduced towards the threshold signal strength level. The reduction of the power level may be implemented over time on a fixed interval, or based on signal strength readings at remote server 114 (e.g., if the signal strength readings are high, such as above a particular threshold, the interval by which the transmission strength is reduced may be higher than if the received signal strength readings are low, or below a threshold strength). The signal strength readings may be made using, for example, received signal strength indication (RSSI) readings. The power may be reduced until the power level of the transmission is at or below the threshold. In some embodiments, the power level may subsequently be increased above the threshold level, after a delay period of being below the threshold (e.g., to help ensure the readings are stable and actually below the threshold for at least some amount of time).

Figure 10:
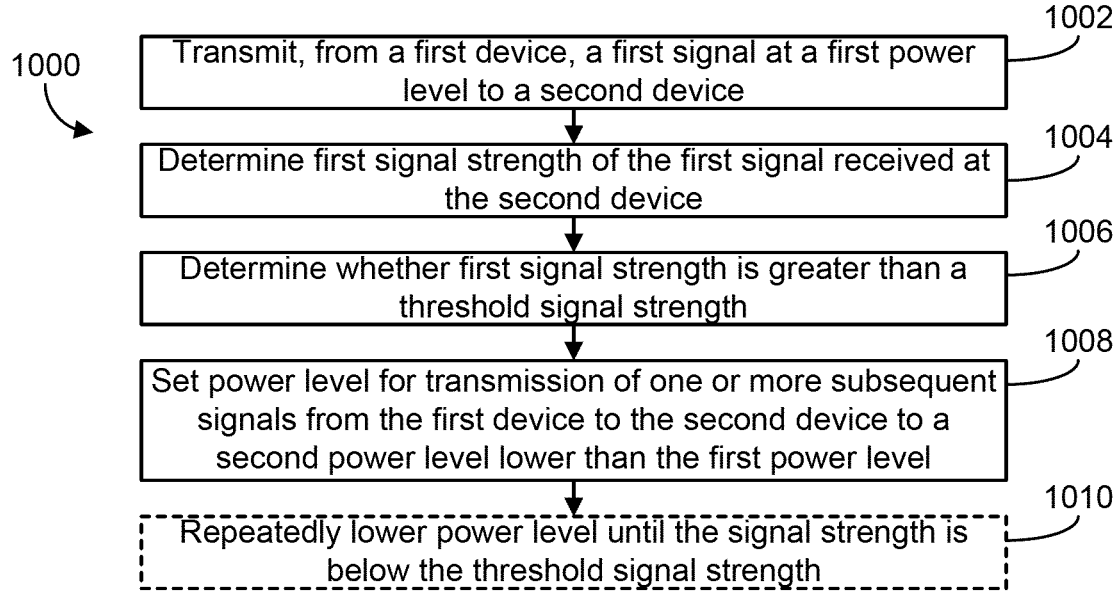
FIG. 10 is a flow chart of a process for managing a power level of transmissions of the portable monitoring device, according to an exemplary embodiment.

Referring also to FIG. 10, a flow chart of a process 1000 for managing portable monitoring device transmissions is shown, according to an exemplary embodiment. Process 1000 may be executed by, for example, power management module 212 and, more particularly, transmit/receive circuit management module 906 of a portable monitoring device 106, in some embodiments. Process 1000 is executed to provide communication in an environment with multiple portable monitoring devices or sensors in one or more transport vehicles transporting cargo, in some embodiments.

Process 1000 includes transmitting, from a first device (e.g., first portable monitoring device), a first signal at a first power level to a second device (e.g., second portable monitoring device or communication-enabled sensor device) (1002). A first signal strength of the first signal received at the second device is determined (1004).

Process 1000 includes determining whether the first signal strength is greater than a threshold signal strength (1006). If so, the power level for transmission of one or more subsequent signals from the first device to the second device is set to a second power level lower than the first power level (1008). Process 1000 may optionally include repeatedly lowering the power level until the signal strength is below the threshold signal strength (1010). Block 1010 may include lowering the power level by intervals (e.g., either via a fixed interval or via a value determined using the signal strength of the signal received at the second device). Block 1010 may further include using RSSI values to determine the signal strength, in order to determine the intervals. In some embodiments, the first device may wait for a delay period after modifying a signal strength before making further modifications, to avoid a "ping-ponging" effect as the link is maintained near the threshold (e.g., to slow response times in a dynamic RF environment with nominal measurement uncertainties). In some implementations, a similar process may be used to lower the transmission power levels of the other device as well.

Referring again to FIG. 9, in some embodiments, the transmissions of portable monitoring device 106 to the one or more other devices may be adjusted using frequency diversity implemented by a frequency diversity module 910. The available frequency channels to portable monitoring device 106 may be split into a plurality of sub-bands (e.g., non-overlapping bands). For example, the 2.4 GHz ISM band includes several channels within the frequency range of the band. In some embodiments, a cellular transceiver of portable monitoring device 106 may be capable of operation on several of the channels (e.g., any of 16 independent channels, such as channels 11-26 in the 2.405 GHz to 2.48 GHz range). Portable monitoring device 106 may choose to send transmissions to remote server 114 based on which frequency channels require the least amount of transmission power for successful transmissions, in some embodiments. For example, frequency channels with less noise may be used, as such channels can be used with less transmission power to successfully complete communications.

In some embodiments, portable monitoring device 106 and more particularly transmit module 214 monitors the frequency channels available for transmissions. For example, all available frequency channels may be scanned periodically, to monitor for signals on the channels. Transmit module 214 may select one or more frequency channels with the least noise or the channel(s) that requires the least amount of transmission power. In some embodiments, frequency channels may be switched when interference on a currently used frequency channel is detected. Detecting interference on a frequency channel may include detecting an interference level above a threshold level.

In some embodiments, as described above, all available frequency channels may be monitored. One or more interference metrics may be calculated that indicate interference levels in each frequency channel. The interference metrics are then used to determine suitable frequency channels for transmissions. In some embodiments, the interference metrics may be used to build a hierarchy, or ordered list of frequency channels to use. The hierarchy is used when frequency channels may need to be switched due to noise or interference (e.g., by selecting a next channel in the hierarchy).

While the activities of power management module 212 may be executed in order to conserve power in a low power situation as described above, in other embodiments the power conversation techniques described herein may be implemented at any time regardless of the current power supply level in the device. In various embodiments, the power consumption of the device may be decreased (or increased) based on a predicted amount of power remaining in the device compared against the amount of time remaining before the device reaches its destination (and no longer has to operate). In some embodiments, the adjustment of the power levels may occur based on location information from location module 218 (e.g., if the transport vehicle is unexpectedly far off of a planned travel route, the power consumption may be appropriately adjusted to prolong life of the device), alert module 216 (e.g., if a warning or alert is generated, power consumption may be increased temporarily to deal with the problem regardless of the remaining power supply), or otherwise.

Figure 11A:
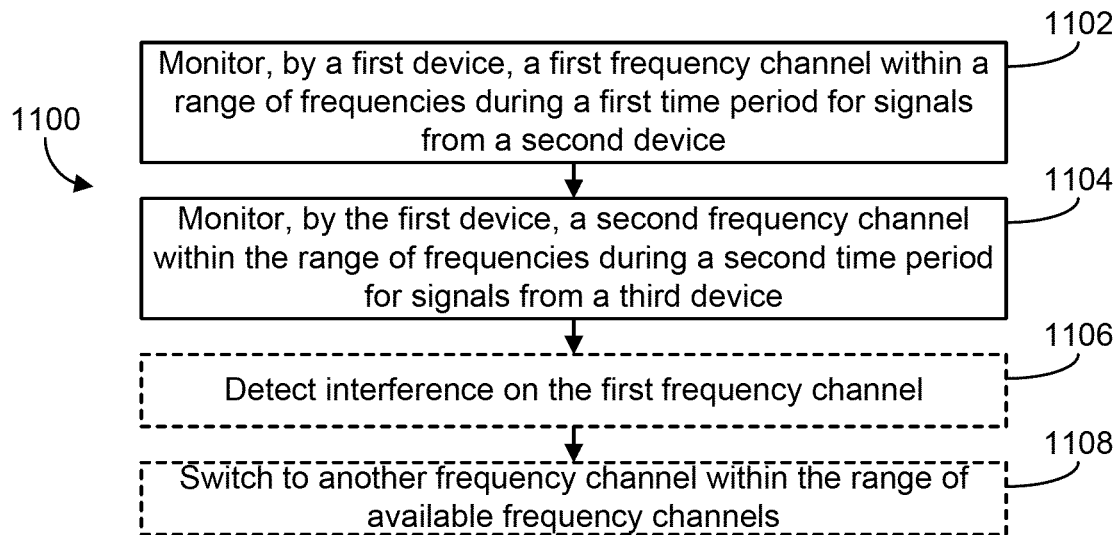
FIG. 11A is a flow chart of a process for communicating between monitoring devices using multiple frequency channels within a frequency range, according to an exemplary embodiment.

Referring now to FIG. 11A, a flow chart of a process 1100 for communicating between a portable monitoring device and one or more other devices using multiple frequency channels within a frequency range is shown, according to an exemplary embodiment. Process 1100 may be executed by, for example, power management module 212 and, more particularly, transmit/receive circuit management module 906.

Process 1100 includes monitoring, by a first device (e.g., first portable monitoring device), a first frequency channel within a range of frequencies during a first time period for signals from a second device (e.g., second portable monitoring device, a communication-enabled sensor device, etc.) (1102). Process 1100 further includes monitoring, by the first device, a second frequency channel within the range of frequencies during a second time period for signals from a third device (e.g., third portable monitoring device) (1104).

In some embodiments, blocks 1102 and/or 1104 include placing the first device in a first mode, such as an active or transmitting mode, during the first and/or second time periods. The first portable monitoring device operates at a particular power level in the first mode. Between the transmissions, the portable monitoring device may operate for at least a period of time in a second mode, such as a sleep mode, in which the device uses less power than in the first mode. In some implementations, the device may operate in the second mode and may wake into the first mode for transmissions with devices or to scan certain frequencies (e.g., may periodically scan particular frequencies and then enter sleep mode to conserve power). In some embodiments, when the transmissions between the first device and second device, and first device and third device, use different frequency channels, a different power level for the two sets of transmissions may be used, as less power may be used for successful transmissions for one of the frequency channels (e.g., due to less interference on one of the channels). This conserves power of the first device.

Process 1100 may optionally include detecting interference on the one or more of the utilized frequency channels (1106) and switching to another frequency channel within the range of available frequency channels (1108). For example, if interference is present in a first frequency channel that would cause extra power to be required for transmissions (e.g., the interference level surpasses an interference threshold), the first device may switch to a different frequency channel to save power. Block 1108 may include choosing a second frequency channel based on a hierarchy or other list of available frequency channels. The hierarchy may be determined based on frequency channel metrics (e.g., a level of interference in each frequency channel).

Figure 11B:
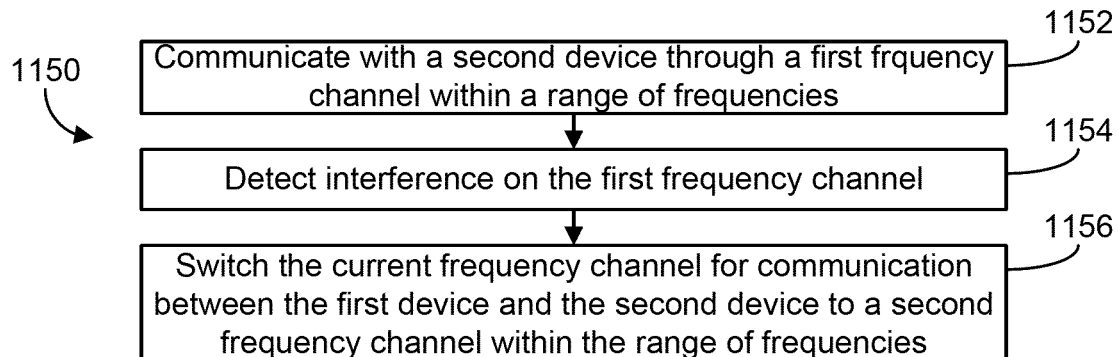
FIG. 11B is a flow chart of a process for switching frequency channels within a frequency range for communications between monitoring devices, according to an exemplary embodiment.
Figure 11C:
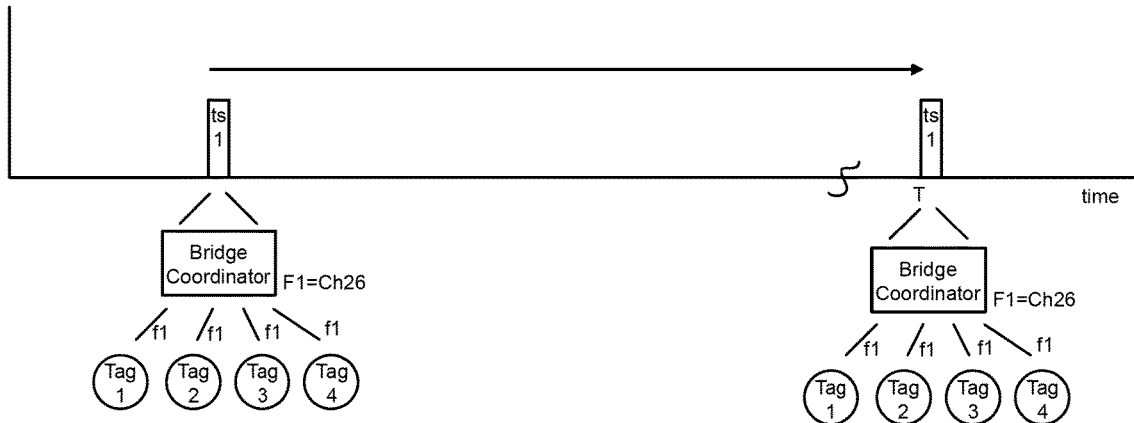
FIG. 11C is an illustration of transmissions during a timeframe using a single frequency channel, according to an exemplary embodiment.

Referring also to FIG. 11C, an illustration of transmissions performed over a timeframe using a single frequency channel is shown, according to an exemplary embodiment. In the illustrated embodiment, a portable monitoring device (e.g., a "bridge coordinator" that communicates with one or more other devices in proximity to the monitoring device, such as sensors) communicates with a plurality of other devices, or "tags" (e.g., sensors that monitor one or more characteristics of the cargo/environment and transmit data to the bridge coordinator), via a single frequency channel. The bridge coordinator communicates with the tags, then waits for an amount of time before communicating again, optionally entering a sleep mode to conserve power between communications.

Figure 11D:
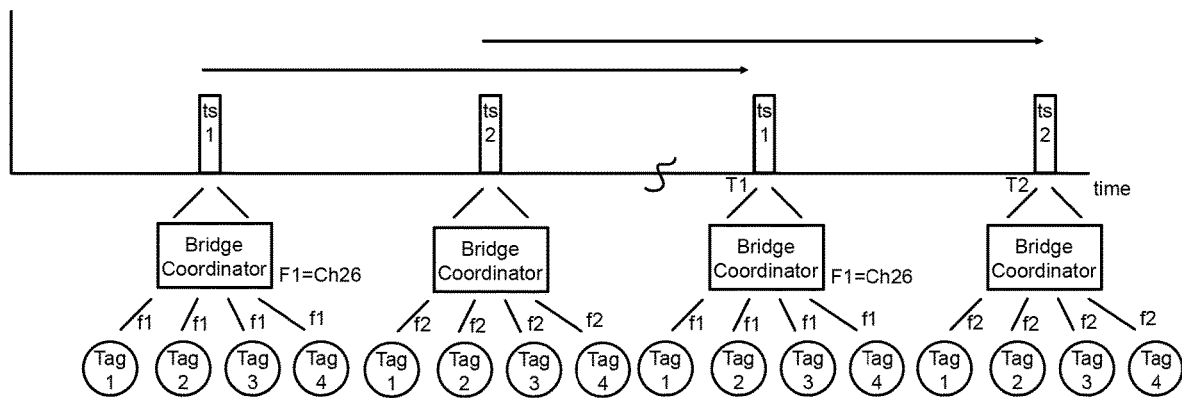
FIG. 11D is an illustration of transmissions during a timeframe performed by communicating with devices using different transmission frequencies at different times within the timeframe, according to an exemplary embodiment.

FIG. 11D illustrates an exemplary embodiment in which the bridge coordinator shown in FIG. 11C communicates with the tags using multiple different channels over the timeframe. In the illustrated embodiment, the bridge coordinator communicates with a first set of tags on a first frequency channel during a first time period within the timeframe, then communicates with a second set of tags on a second frequency channel during a second time period within the timeframe. The bridge coordinator may alternate between channels, in some embodiments (e.g., periodically). The bridge coordinator may optionally enter the sleep mode between communications to conserve power.

Referring to FIG. 11B, a flow chart of a process 1150 for communicating between a portable monitoring device and one or more other devices by switching between frequency channels within a frequency range is shown, according to an exemplary embodiment. Process 1150 may be executed by, for example, power management module 212 and, more particularly, transmit/receive circuit management module 906.

Process 1150 includes communicating between a first portable monitoring device and a second device (e.g., a communication-enabled sensor device, second portable monitoring device, etc.) via a first frequency channel within a range of frequencies (1152). Process 1150 further includes detecting interference on the first frequency channel (1154). Interference may be detected, for example, using interference metrics, as described in further detail above. Process 1150 further includes switching the current frequency channel for communicating with the second device to a second frequency channel within the range of frequencies in response to detecting the interference (1156). In some implementations, the first device may switch the frequency channel in response to detecting interference above a threshold level. In some embodiments, the first device may switch the frequency channel to a channel having a lowest amount of interference between available frequency channels. For example, in some embodiments, the first device may generate and/or utilize a hierarchy of channels, as discussed above. In some embodiments, the first device may transmit a command to the second device configured to cause the second device to change to the new frequency channel for communications with the first device.

Figure 11E:
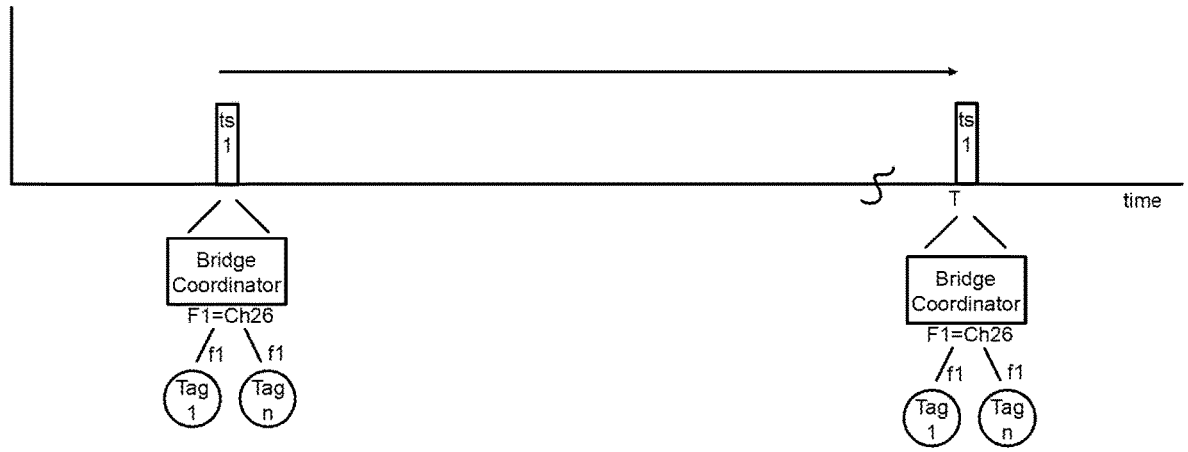
FIG. 11E is an illustration of transmissions during a timeframe using a single frequency channel, according to another exemplary embodiment.
Figure 11F:
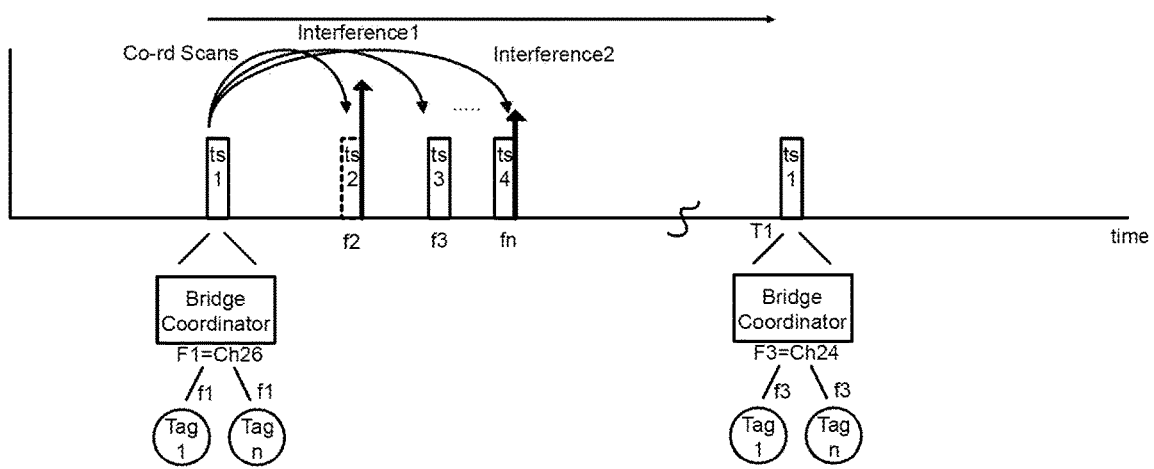
FIG. 11F is an illustration of transmissions during a timeframe performed by switching from a first frequency channel to a second frequency channel, according to an exemplary embodiment.

FIG. 11E illustrates another exemplary embodiment in which a bridge controller communicates with multiple tags using a single frequency. FIG. 11F illustrates an exemplary embodiment in which the bridge controller shown in FIG. 11E communicates with tags by switching frequencies in response to detecting interference. The bridge controller first communicates with the tags on a first frequency (e.g., channel 26). The bridge controller scans multiple frequency channels (e.g., all the frequency channels within the band) to evaluate a level of interference on the frequency channels. The bridge controller determines a lowest level of interference exists on a third frequency channel (e.g., channel 24). The bridge controller then switches to the third frequency channel for the next communication with the tags. In some embodiments, the bridge controller transmits a command to the tags informing the tags of the channel change.

Figure 12:
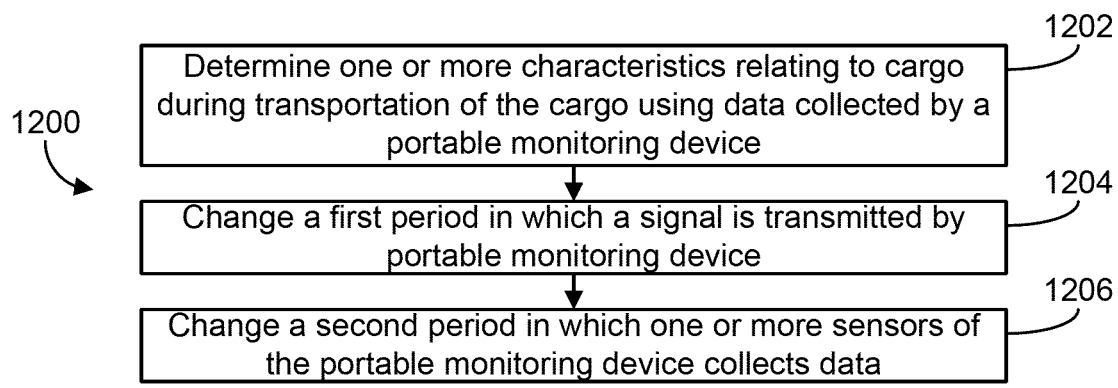
FIG. 12 is a flow chart of a process for managing sensor activities of the portable monitoring device based on power conservation features, according to an exemplary embodiment.

Referring now to FIG. 12, a flow chart of a process 1200 for managing reporting and/or sensor measurement intervals of a portable monitoring device based, for example, on power conservation features is shown, according to an exemplary embodiment. Process 1200 may be executed by, for example, power management module 212 and, more particularly, sensor management module 904, in some embodiments.

Process 1200 includes determining one or more characteristics relating to cargo during transportation of the cargo using data collected by a portable monitoring device (1202). The portable monitoring device is configured to periodically transmit a signal generated using the data to a remote server (e.g., to periodically report a location of the monitoring device and/or a condition of the goods being transported). Process 1200 includes changing at least one of a first period at which the signal is transmitted by the portable monitoring device (1204) and a second period at which one or more sensors of the portable monitoring device collect the data used to determine the one or more characteristics (1206). For example, the rate at which signals are transmitted to the remote server may be increased or decreased based on the characteristics, and/or the rate at which the sensors capture data may be increased or decreased.

In some embodiments, the first period and/or second period may be adjusted based on the power level of the portable monitoring devices. For example, if the battery of the portable monitoring device is running low, the first period and/or second period may be increased to space out sensor readings and sensor data transmissions.

In some embodiments, location data is used to adjust the first period and/or second period. For example, if the cargo is currently on an airplane or a ship, sensor data transmissions may be spread out in time or temporarily suspended.

In some embodiments, sensor data is used to adjust the first period and/or second period. For example, if a sudden change in ambient light occurs in the transport vehicle (e.g., a door of the transport vehicle is opened), the ambient light sensor of the portable monitoring device may sense the change, and the rate at which sensors capture data may be increased or decreased. Similarly, if a temperature level in the transport vehicle experiences a sudden increase or decrease, the rate at which sensors capture data may be increased.

In some implementations, the reporting and/or monitoring rates may be adjusted using a time and/or distance elapsed during the current trip and/or an estimated time and/or distance to the destination for the trip, alone or in combination with the factors above. For example, the portable monitoring device and/or remote server may estimate a remaining battery life and a time or distance to the destination and, using known characteristics of the battery (e.g., a rate at which the battery dissipates at different reporting and/or monitoring periods), determine whether to adjust the reporting and/or monitoring periods. For example, if the comparison indicates the battery life is at risk of not lasting through the end of the trip (e.g., if the estimated time to the destination exceeds the estimated remaining battery life, or the battery life exceeds the remaining time to the destination by less than a threshold amount), a length of time between transmissions to the remote server and/or capturing of measurements by one or more of the sensors may be increased. In some embodiments, if the comparison indicates the battery life exceeds the remaining time to the destination (e.g., by more than a threshold), a length of time between transmissions to the remote server and/or capturing of measurements by one or more sensors may be reduced, such that the device reports and/or takes measurements more frequently.

In some embodiments, the reporting and/or monitoring periods may additionally or alternatively be determined based in part on a type of cargo being transported. For example, if the goods being transported are not sensitive to changes in temperature, the monitoring period may be permitted to be increased without restrictions based on the type of cargo. In some embodiments, if the goods are sensitive to changes in temperature or other conditions being monitoring by the sensors, one or more restrictions may be placed on changes in the monitoring period. For example, if a perishable good is sensitive to temperature changes above a threshold temperature, or if an agreement with the party requesting shipping indicates that the temperature cannot rise above a particular amount, the monitoring period may be restricted to be no greater than a threshold length of time between measurements to help ensure the temperature requirements are met throughout the trip. In some such embodiments, the portable monitoring device and/or remote server may adjust the reporting period to conserve battery life.

In some implementations, such as certain implementations described above, a portable monitoring device may communicate with other devices in proximity to the portable monitoring device. For example, the monitoring device could communicate with tags, or communication-enabled sensors, that monitor environmental conditions of various portions of the cargo (e.g., temperature of cargo on different pallets). In another example, monitoring device could additionally or alternatively communicate with another monitoring device within another vehicle or portion of the vehicle in proximity to the monitoring device.

In such implementations, multiple different frequency bands may be used to communicate with different devices connected to the portable monitoring device. For example, a first set of tags may communicate on a first frequency band with a first transceiver of the monitoring device, and a second set of tags may communicate on a second frequency with a second transceiver of the monitoring device. In some embodiments, a single transceiver configured to operate in multiple frequency bands may be used in the monitoring device. Allowing communication with devices at multiple frequencies may allow the system to take advantage of operational attributes associated with data redundancy, propagation characteristics, data latency, etc. Combing two separate, independent transceivers may add performance diversity to the system. Additionally, supporting multiple frequencies may allow for use of a wider variety of sensors and other devices, which may be designed to operate at a variety of frequencies, modulations, and/or formats.

Figure 13:
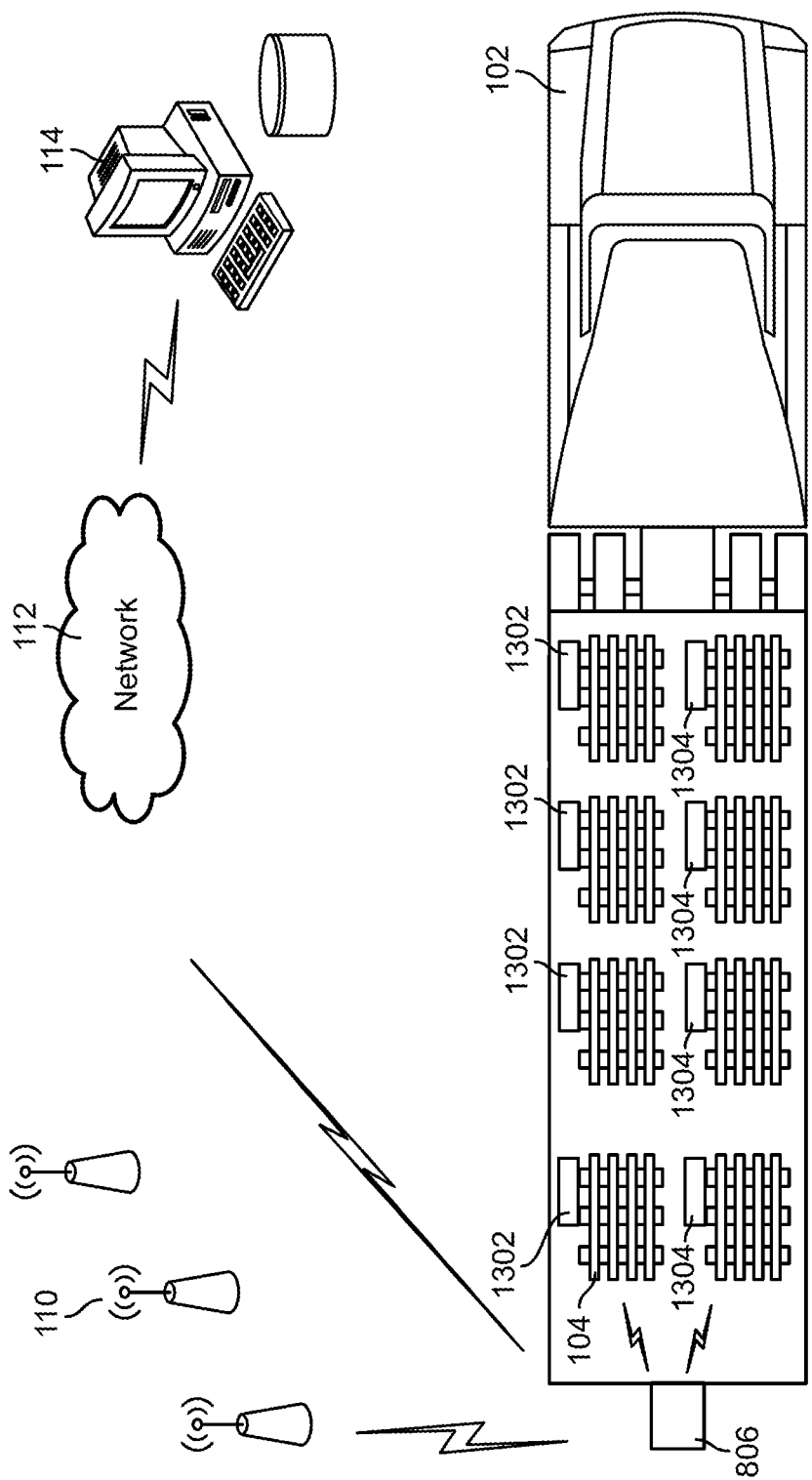
FIG. 13 is a diagram illustrating a portable monitoring device configured to communicate with a remote server and with other monitoring devices using multiple frequencies, according to an exemplary embodiment.

Referring now to FIG. 13, an illustration of an environment including a transport vehicle 102 carrying goods 104 monitored using a portable monitoring device 1306 is shown, according to an exemplary embodiment. Goods 104 are held within a cargo enclosure, and are carried on multiple pallets. In the illustrated embodiment, a separate tag is attached to each pallet to monitor characteristics (e.g., temperatures) of the cargo on the pallet.

Two groups of tags shown in FIG. 13 operate on different frequency bands. Tags 1302 operate on a first frequency band. In some embodiments, tags 802 may operate on a 2.4 GHz band, such as on a local IEEE 802.15.4-like local communication network. Tags 1304 operate on a second frequency band, such as a 433 MHz band. Local sensor data from tags 1302 can be augmented/supplemented with data from tags 1304 by designing portable monitoring device 1306 to include a secondary transceiver and bridging the frequency bands. Data from tags 1304 can be demodulated in a transceiver of device 1306 configured to communicate on the frequency band of tags 1304. The resultant data can be applied to a processor of device 1306 along with data serviced by a transceiver configured to receive a process data from tags 1302 in the frequency band of tags 1302. In some embodiments, ancillary memory may be added to the processor of device 1306 to provide sufficient buffering of two data streams from the two frequency bands. A composite data stream can be sent to a cellular modem of device 1306 for transmission to a remote server 114 using cell towers 110. In some embodiments, location data (e.g., generated by a cellular transceiver and/or GPS receiver) can be appended to the data prior to transmission to remote server 114.

Figure 14:
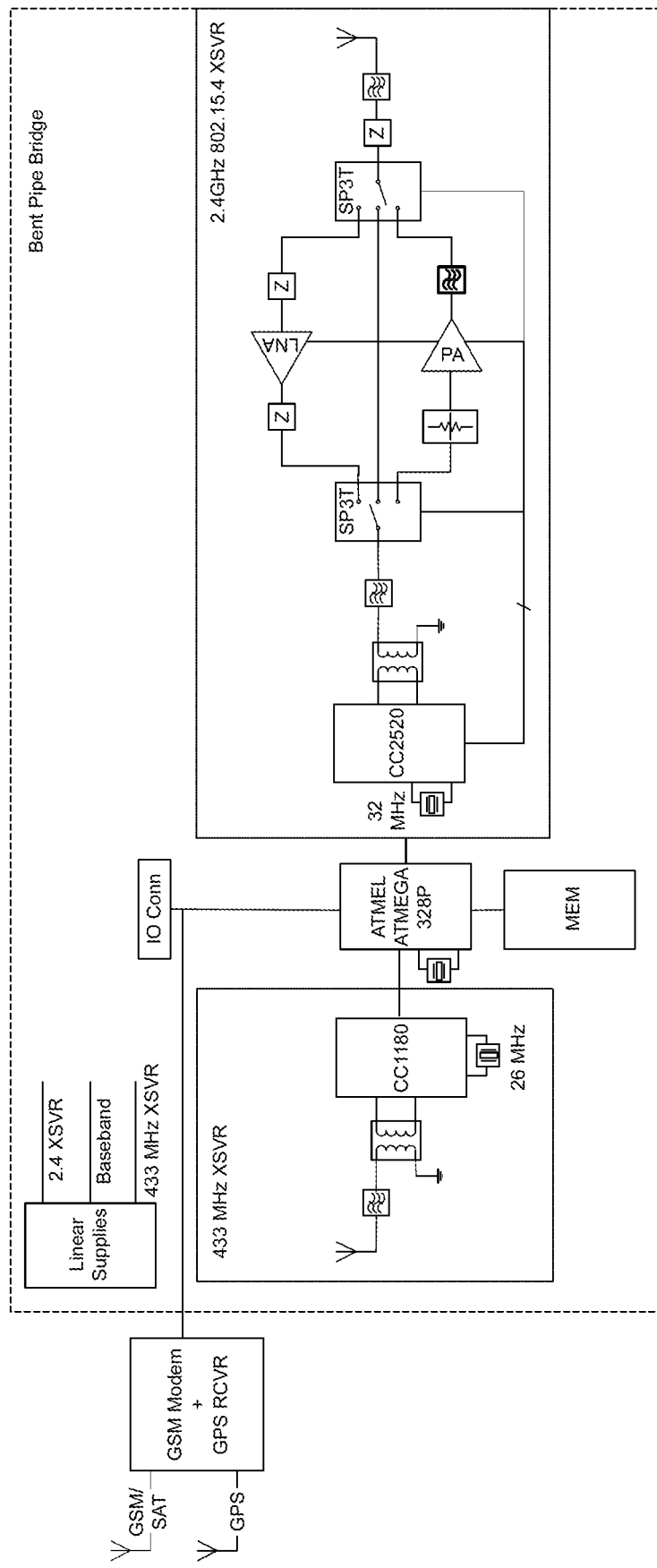
FIG. 14 is a block diagram of a portion of the portable monitoring device of FIG. 13, according to an exemplary embodiment.

FIG. 14 illustrates a block diagram of a portion of device 1306 configured to provide communication with devices in multiple frequency bands, according to an exemplary embodiment. In the block diagram, a 2.4 GHz cellular transceiver module receives communications in the 2.4 GHz frequency band, and a lower-frequency transceiver or network analyzer module receives communications in the 433 MHz band. The communications are provided by a microprocessor including a memory configured to provide a data buffer for the streams from the 2.4 GHz and 433 MHz modules. The data may be processed by the processor (e.g., interpret the data, perform actions based on the data, append further information, such as location information, to the data, etc.), and may be transmitted to an input/output interface for transmission to one or more remote devices, such as remote server 114.

Figure 15A:
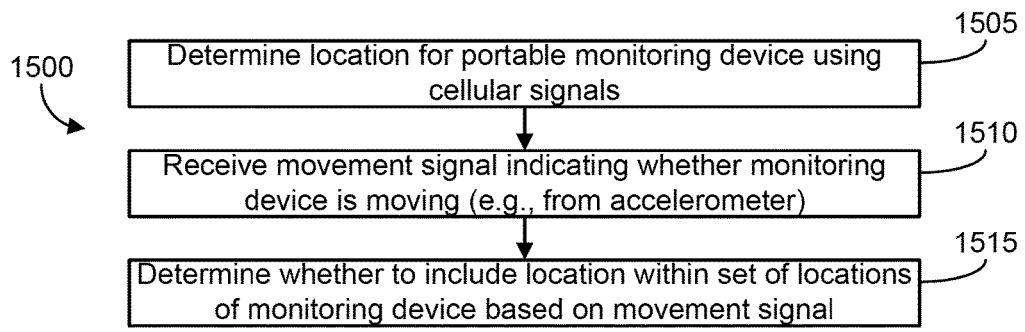
FIG. 15A is a flow chart of a process for determining a location of the portable monitoring device, according to an exemplary embodiment.

Referring generally to FIGS. 15A-16D, motion detection activities of portable monitoring device 106 are described in greater detail. Referring to FIG. 15A, a flow chart of a process 1500 for determining a location of a portable monitoring device is shown according to an exemplary embodiment. Process 1500 may be executed by, for example, portable monitoring device 106 of FIG. 2 or remote server 114 of FIG. 3.

Portable monitoring device 106 or remote server 114 may determine a location for the device using one or more cellular signals received by the device (1505). The location of portable monitoring device 106 may be determined using one or more methods described above, such as through cell tower triangulation.

Portable monitoring device 106 or remote server 114 may receive a movement signal indicating whether the device is moving from a movement detection device, such as an accelerometer (1510). In some embodiments, the movement signal may be a vibration signal indicating an intensity and/or duration of vibration sensed by the movement detection device.

Portable electronic device 106 and/or remote server 114 may determine whether to include the location determined using the cellular signal(s) within a set of locations of the device (e.g., to be reported to a user device) based on the movement signal (1515). In some embodiments, the location determined using the cellular signals may indicate movement from a prior location (e.g., a last determined location), and accelerometer data may indicate portable monitoring device 106 has not moved. The location may be excluded from the set of locations of portable monitoring device 106 (e.g., based on an assumption that the cellular data incorrectly indicates movement when none has actually occurred). In some embodiments, the accelerometer data may indicate an amount of movement less than the amount indicated by the location calculated using the cellular signals. The location may be excluded, or may be dampened such that the movement from the prior location is reduced in the location data for portable monitoring device 106. In some embodiments, the cellular data may indicate no movement (e.g., movement under a threshold amount), and the accelerometer data may indicate portable monitoring device 106 was moving. The location based on the cellular data may be recalculated to determine whether the originally analyzed cellular signals indicated movement less than what actually occurred.

Figure 15B:
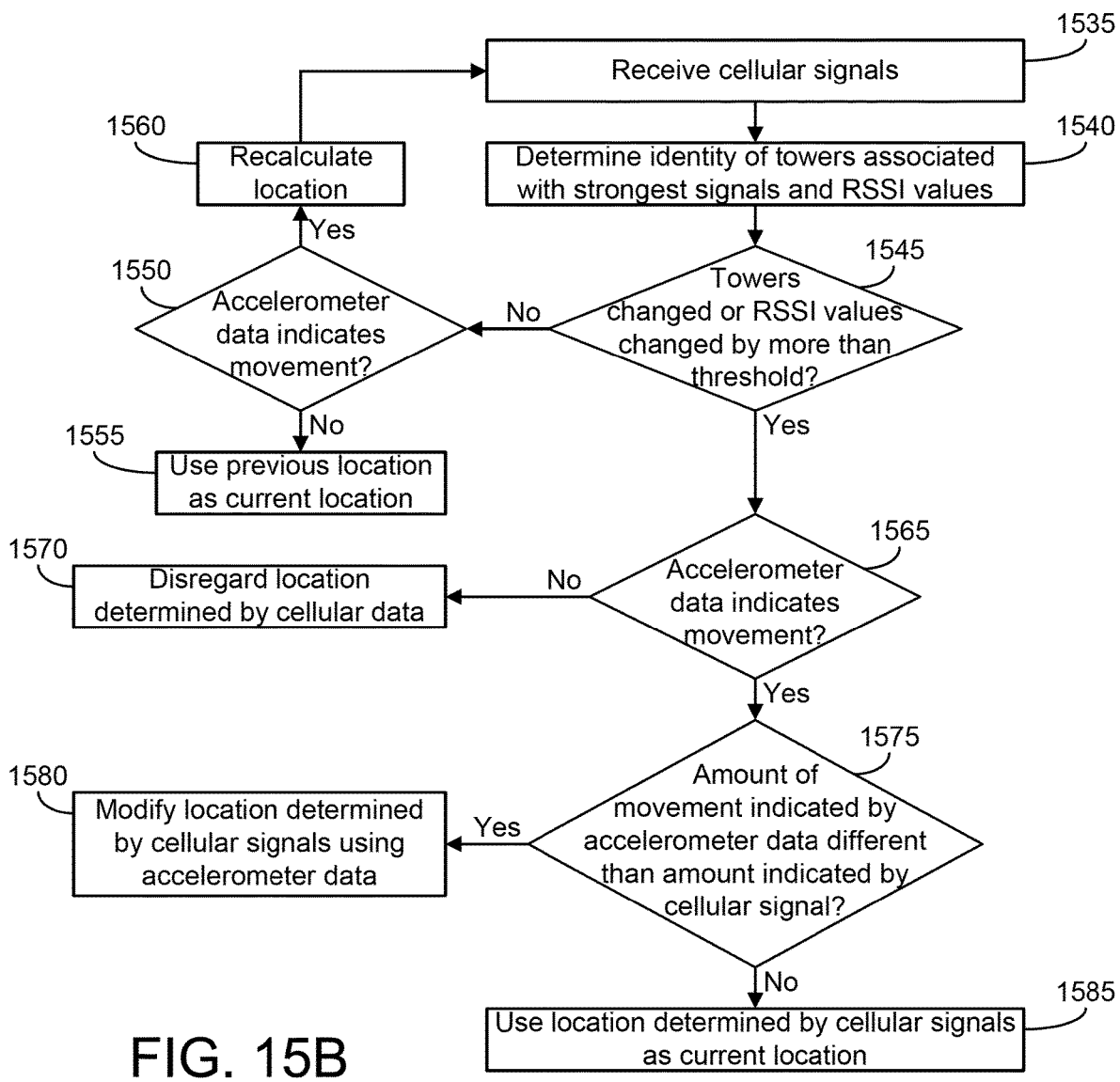
FIG. 15B is a flow chart of a detailed implementation of the process shown in FIG. 15A, according to an exemplary embodiment.

Referring now to FIG. 15B, a flow diagram illustrating a process 1530 for determining a location of a portable monitoring device is shown, according to an exemplary embodiment. Process 1530 is one detailed exemplary implementation of process 1500.

Portable monitoring device 106 may receive one or more cellular signals from cell towers (1535). Portable monitoring device 106 and/or remote server 114 may analyze the signals and determine signal strength (e.g., RSSI) values associated with the signals (1540). In some embodiments, portable monitoring device 106 and/or remote server 114 may determine cell tower identifiers associated with the signals, and may determine whether the towers associated with a set of strongest signals have changed since a last location determination or reporting process.

Portable monitoring device 106 and/or remote server 114 may determine whether the signal strength values have changed by more than a threshold amount and/or whether the cell towers used for location determination have changed (1545). If not, portable monitoring device 106 and/or remote server 114 may determine whether the accelerometer or other movement detection device data indicates movement (e.g., the accelerometer reading is above a threshold value) (1550). If the accelerometer data does not indicate movement, the accelerometer data is consistent with the cellular data, and the previous location is used as the current location (1555). If the accelerometer data indicates movement, portable monitoring device 106 and/or remote server 114 may determine the cellular data is inconsistent with the accelerometer data, and the location of the device may be recalculated (1560).

If the signal strength values have changed by more than a threshold amount and/or the cell towers used for location determination have changed, portable monitoring device 106 and/or remote server 114 may determine whether the accelerometer data indicates movement (1565). If not, portable monitoring device 106 and/or remote server 114 may determine that the accelerometer data is inconsistent with the cellular data (e.g., due to the spidering effect). In some embodiments, portable monitoring device 106 and/or remote server 114 may disregard the location determined using the cellular signals and exclude the location from a set of locations for the device (1570).

If the accelerometer data indicates movement, portable monitoring device 106 and/or remote server 114 may determine whether an amount of movement indicated by the accelerometer data is different than an amount of movement indicated by the cellular signals (1575). In some embodiments, portable monitoring device 106 and/or remote server 114 may determine whether the amount of movement indicated by the accelerometer data is inconsistent with the amount of movement indicated by the cellular signals, such that one or both of the cellular data or the accelerometer data is likely inaccurate. If the amount of movement indicated by the accelerometer and cellular data is consistent, portable monitoring device 106 and/or remote server 114 may use the location determined by the cellular signals as a current location of the device and/or add the location to a set of locations of the device (1585). If the amount of movement indicated by the accelerometer and cellular data is inconsistent, portable monitoring device 106 and/or remote server 114 may modify the location determined by the cellular signals based on the accelerometer data (1580). For example, the location may be adjusted by dampening the value of the difference between the locations (e.g., reducing the magnitude of the difference), and adjusting the previous location by the dampened value to obtain the new location. This is illustrated in greater detail in FIGS. 16A and 16D in an illustrative implementation. An undampened location map is shown in FIG. 16A, while a location map with dampened values is shown in FIG. 16D.

Referring now to FIGS. 16A-D, example user interfaces are shown that may be generated by, for example, display module 316. User interfaces 1600, 1610, 1620, 1630 may generally be displays showing a current location of a transport vehicle on a map. While a simple map is shown in FIGS. 16A-D, it should be understood that the displays may include any number of features or text, and may be provided to a user on any kind of device (e.g., laptop, tablet, mobile device) in any format (e.g., graph, map, text only, email, etc.).

User interface 1600 of FIG. 16A illustrates the spidering problem. Previous locations 1602, 1604 of the transport vehicle are shown. If the transport vehicle stops moving at location 1604, cellular signals sent to the portable monitoring device and used to calculate the vehicle location may still indicate movement. Without accounting for the spidering issue, a new location 1606 may be calculated that is different than location 1604, despite the vehicle not moving. Referring also to user interface 1630 of FIG. 16D, when the spidering issue is accounted for, a different new location 1606 is still calculated in some embodiments, but the magnitude of the change in location is lessened.

Referring to user interface 1610 of FIG. 16B, an example map is shown highlighting multiple previous locations 1602 and a current location 1604. In user interface 1620 of FIG. 16C, display module 316 may be configured to provide various icons or features on the display to highlight both the vehicle location and status. For example, the display may include an indication that the vehicle has stopped. In the illustrated implementations, each dot may represented an instance of a reported location within a set of locations for the portable monitoring device.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, orientations, etc.). By way of example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on memory or other machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products or memory comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, by way of example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method for monitoring transported cargo comprising:
    monitoring a location of cargo during transportation of cargo using data collected by a portable monitoring device, wherein the portable monitoring device transmits messages at a first power level;
    receiving input data from one or more sensors of the portable monitoring device, the input data relating to one or more characteristics pertaining to the cargo, wherein the input data is received via a designated frequency band that communicates with sensor devices;
    in response to (i) the location of cargo being within a geographic area associated with a destination and (ii) the input data indicating at least one of:
        (a) a light sensor of the portable monitoring device measuring an increased intensity of ambient light;
        (b) a temperature sensor of the portable monitoring device measuring an increase in temperature above a threshold level; and
        (c) an accelerometer of the portable monitoring device indicating a vehicle carrying the cargo is stationary,
    monitoring a set of available frequency channels, including a first frequency channel and a second frequency channel;
    initiating communication with an external device located proximate to the destination on the first frequency channel and the second frequency channel;

detecting a first interference metric on the first frequency channel and a second interference metric on the second frequency channel;
in response to the first interference metric being greater than the second interference metric, transmitting a message to the external device at the first power level on the second frequency channel;
in response to the second interference metric being greater than the first interference metric, transmitting the message to the external device at the first power level on the first frequency channel;
receiving, from the external device, a response to the message transmitted to the external device;
in response to receiving the response to the message, generating an alert indicating the cargo has reached the destination; and
reducing the first power level of the portable monitoring device by a predetermined interval in response to a received signal strength of the message transmitted at the first power level exceeding a threshold value, wherein the external device determines the received signal strength of the messages transmitted at the first power level.

2. The method of claim 1, wherein monitoring the location of the cargo using data collected by the portable monitoring device comprises monitoring the location of the cargo using cellular signals received by a cellular transceiver of the portable monitoring device.

3. The method of claim 2, further comprising generating a command configured to cause a subscriber identity module (SIM) card coupled to the cellular transceiver of the portable monitoring device to deactivate in response to generating the alert indicating the cargo has reached the destination.

4. The method of claim 1, further comprising performing at least one of the following in response to generating the alert indicating the cargo has reached the destination:
disabling measurement of the temperature using the temperature sensor of a temperature recording device; or
excluding temperature measurements measured after the alert is generated from a set of temperature measurements for the cargo.

5. The method of claim 1, further comprising generating a second alert indicating transportation of the cargo has begun in response to a combination of the location of the cargo monitored using the portable monitoring device and the input data from the one or more sensors of the portable monitoring device.

6. The method of claim 1, wherein the one or more sensors comprise a communication circuit configured to communicate with the external device located proximate to the destination, and wherein generating the alert in response to receiving the response to the message includes generating the alert in response to determining the location of the cargo is within the geographic area associated with the destination and the input data indicates the communication circuit has received the message from the external device located proximate to the destination.

7. The method of claim 1, further comprising:
determining a distance from a current location of the portable monitoring device to the destination;
determining a first time at which delivery of the cargo is scheduled to be completed;
estimating a second time at which the cargo is expected to be delivered using the distance;
determining whether the cargo is likely to be delivered by the first time by comparing the first time to the second time; and
providing a notification to a user in response to determining the cargo is likely to be delivered after the first time.

8. A system for monitoring transported cargo comprising:
one or more processors operably coupled to one or more memories and configured to communicate with a portable monitoring device configured to monitor cargo during transportation of the cargo, the one or more processors configured to:
monitor a location of cargo during transportation of the cargo using data collected by the portable monitoring device, wherein the portable monitoring device transmits messages at a first power level;
receive input data generated by one or more sensors of the portable monitoring device, the input data relating to one or more characteristics pertaining to the cargo, wherein the input data is received via a designated frequency band that communicates with sensor devices;
in response to (i) the location of cargo being within a geographic area associated with a destination and (ii) the input data indicating at least one of:
(a) a light sensor of the portable monitoring device measuring an increased intensity of ambient light;
(b) a temperature sensor of the portable monitoring device measuring an increase in temperature above a threshold level; and
(c) an accelerometer of the portable monitoring device indicating a vehicle carrying the cargo is stationary,
monitor a set of available frequency channels, including a first frequency channel and a second frequency channel;
initiate communication with an external device located proximate to the destination on the first frequency channel and the second frequency channel;
detect a first interference metric on the first frequency channel and a second interference metric on the second frequency channel;
in response to the first interferences metric being greater than the second interference metric, transmit a message to the external device at the first power level on the second frequency channel;
in response to the second interference metric being greater than the first interference metric, transmit the message to the external device at the first power level on the first frequency channel;
receive, from the external device, a response to the message transmitted to the external device;
in response to receiving the response to the message, generate an alert indicating the cargo has reached the destination; and
reduce the first power level of the portable monitoring device by a predetermined interval in response to a received signal strength of the message transmitted at the first power level exceeding a threshold value, wherein the external device determines the received signal strength of the messages transmitted at the first power level.

9. The system of claim 8, wherein the one or more processors are configured to:
monitor the location of the cargo using cellular signals received by a cellular transceiver of the portable monitoring device; and
generate a command configured to cause a subscriber identity module (SIM) card coupled to the cellular transceiver of the portable monitoring device to deactivate in response to generating the alert indicating the cargo has reached the destination.

10. The system of claim 8, wherein the one or more processors are configured to perform at least one of the following in response to generating the alert indicating the cargo has reached the destination:
   disabling measurement of the temperature using the temperature sensor of a temperature recording device; or
   excluding temperature measurements measured after the alert is generated from a set of temperature measurements for the cargo.

11. The system of claim 8, further comprising a communication circuit configured to communicate with the external device located proximate to the destination, wherein the one or more processors are configured to generate the alert in response to receiving the response to the message includes generating the alert in response to determining the location of the cargo is within the geographic area associated with the destination and the input data indicates the communication circuit has received the message from the external device located proximate to the destination.

12. The system of claim 8, wherein the one or more processors are further configured to:
   determine a distance from a current location of the portable monitoring device to the destination;
   determine a first time at which delivery of the cargo is scheduled to be completed;
   estimate a second time at which the cargo is expected to be delivered using the distance;
   determine whether the cargo is likely to be delivered by the first time by comparing the first time to the second time; and
   provide a notification to a user in response to determining the cargo is likely to be delivered after the first time.

13. A system for monitoring transported cargo comprising:
   one or more sensors, the one or more sensors comprising at least one of a light sensor, a temperature sensor, an accelerometer, or a communication circuit; and
   one or more processors operably coupled to one or more memories and configured to monitor cargo during transportation of the cargo, the one or more processors configured to:
      monitor a location of cargo during transportation of the cargo;
      receive, from the one or more sensors, input data from relating to one or more characteristics pertaining to the cargo, wherein the input data is received via a designated frequency band that communicates with sensor devices; and
      generate an alert indicating the cargo has reached a destination in response to a combination of the location of the cargo monitored using a portable monitoring device and the input data from the one or more sensors of the portable monitoring device, wherein the portable monitoring device transmits messages at a first power level, and wherein the one or more processors are configured to generate the alert in response to determining the location of the cargo is within a geographic area associated with the destination and the input data indicates at least one of the following:
      the light sensor has measured an increased intensity of ambient light;
      the temperature sensor has measured an increase in temperature above a threshold level;
      the accelerometer indicates a vehicle carrying the cargo is stationary; or
   the communication circuit has received a response from an external device located proximate to the destination in response to the communication circuit transmitting a message to the external device, wherein the communication circuit determines that the message from the external device is received by:
      monitoring a set of available frequency channels, including a first frequency channel and a second frequency channel;
      initiating communication with the external device located proximate to the destination on the first frequency channel and the second frequency channel;
      detecting a first interference metric on the first frequency channel and a second interference metric on the second frequency channel;
      in response to the first interference metric being greater than the second interference metric, transmitting the message to the external device at the first power level on the second frequency channel;
      in response to the second interference metric being greater than the first interference metric, transmitting a the message to an the external device at the first power level on the first frequency channel;
      receiving, from the external device, a response to the message transmitted to the external device; and
      reduce the first power level of the portable monitoring device by a predetermined interval in response to a received signal strength of the message transmitted at the first power level exceeding a threshold value, wherein the external device determines the received signal strength of the messages transmitted at the first power level.

* * * * *